United States Patent
Liu

(10) Patent No.: US 9,414,281 B2
(45) Date of Patent: Aug. 9, 2016

(54) DATA TRANSMISSION METHOD, OFFLOADING POINT DEVICE, USER EQUIPMENT, AND SYSTEM

(71) Applicant: HUAWEI TECHNOLOGIES CO., LTD., Shenzhen, Guangdong (CN)

(72) Inventor: Sheng Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 204 days.

(21) Appl. No.: 14/092,397

(22) Filed: Nov. 27, 2013

(65) Prior Publication Data

US 2014/0086211 A1     Mar. 27, 2014

Related U.S. Application Data

(63) Continuation of application No. PCT/CN2011/074982, filed on May 31, 2011.

(51) Int. Cl.
*H04W 36/22* (2009.01)
*H04L 12/721* (2013.01)

(52) U.S. Cl.
CPC ............... *H04W 36/22* (2013.01); *H04L 45/38* (2013.01)

(58) Field of Classification Search
CPC ..................................................... H04W 36/22
USPC ....................................................... 370/331
See application file for complete search history.

(56) References Cited

U.S. PATENT DOCUMENTS

| 8,590,023 B2 * | 11/2013 | Gupta | H04W 12/06 370/329 |
| 8,594,628 B1 * | 11/2013 | Schroeder et al. | 455/411 |
| 2004/0266426 A1 | 12/2004 | Marsh et al. | 455/426.2 |
| 2009/0245206 A1 * | 10/2009 | Liu | 370/331 |
| 2010/0075659 A1 | 3/2010 | Kim et al. | 455/422.1 |
| 2010/0208698 A1 * | 8/2010 | Lu et al. | 370/331 |

(Continued)

FOREIGN PATENT DOCUMENTS

| CN | 1795643 A | 6/2006 |
| CN | 101150493 A | 3/2008 |

(Continued)

OTHER PUBLICATIONS

Soliman, Hesham (Editor), "Mobile IPv6 Support for Dual Stack Hosts and Routers," Memo for the *Network Working Group, Internet Engineering Task Force*, Jun. 2009, pp. 1-41, Elevate Technologies.

(Continued)

*Primary Examiner* — Rasheed Gidado
(74) *Attorney, Agent, or Firm* — Staas & Halsey LLP

(57) ABSTRACT

An embodiment of the present invention provides a data transmission method, which includes: receiving offloading control signaling sent by a user equipment, where the offloading control signaling carries a cellular network identifier and a wireless local area network WLAN identifier of the user equipment; establishing correspondence between the WLAN identifier of the user equipment and all bearer channels of the user equipment; determining a bearer channel corresponding to all or a part of the user data streams. Embodiments of the present invention further provide a corresponding device and system. Through the technical solutions of the embodiments of the present invention, a transmission rate of a system can be increased.

40 Claims, 17 Drawing Sheets

---

501 — Send offloading control signaling to an offloading point device, where the offloading control signaling carries a cellular network identifier and a wireless local area network WLAN identifier of a user equipment 502 — Negotiate with the offloading point device to determine a data offloading manner

(56) References Cited

U.S. PATENT DOCUMENTS

| | | | |
|---|---|---|---|
| 2010/0273475 A1 | 10/2010 | Lee et al. | 455/426.1 |
| 2011/0075557 A1 | 3/2011 | Chowdhury et al. | |
| 2011/0090794 A1 | 4/2011 | Cherian et al. | |
| 2011/0307617 A1* | 12/2011 | Wu | H04L 29/12952 709/228 |
| 2011/0317560 A1* | 12/2011 | Aramoto et al. | 370/235 |
| 2012/0163298 A1 | 6/2012 | Zhou et al. | 370/328 |

FOREIGN PATENT DOCUMENTS

| | | |
|---|---|---|
| CN | 101897158 A | 11/2010 |
| CN | 102045714 A | 5/2011 |
| CN | 102075566 A | 5/2011 |
| EP | 2 375 818 | 10/2011 |
| EP | 2 472 944 | 7/2012 |
| WO | WO 2010/079715 | 7/2010 |
| WO | WO 2011/035473 | 3/2011 |

OTHER PUBLICATIONS

"3rd Generation Partnership Project; Technical Specification Group Services and System Aspects; Mobility between 3GPP-Wireless Local Area Network (WLAN) interworking and 3GPP systems (Release 9)," 3GPP TS 23.327 V9.0.0 (Dec. 2009) *Technical Specification*, 2009, pp. 1-27, 3GPP Organizational Partners, Valbonne, France.

"3rd Generation Partnership Project; Technical Specification Group Services and System Aspects; 3GPP system to Wireless Local Area Network (WLAN) interworking; System description (Release 9)," 3GPP TS 23.234 V9.0.0 (Dec. 2009) *Techincal Specification*, 2009, pp. 1-84, 3GPP Organizational Partners, Valbonne, France.

*Wi-Fi Offload Whitepaper*, Apr. 19, 2010, pp. 1-29, Version 1.0, GSM Association.

"3rd Generation Partnership Project; Technical Specification Group Services and System Aspects; IP flow mobility and seamless Wireless Local Area Network (WLAN) offload; Stage 2 (Release 10)," 3GPP TS 23.261 V10.1.0 (Sep. 2010) *Technical Specification*, 2010, pp. 1-22, 3GPP Organizational Partners, Valbonne, France.

"3rd Generation Partnership Project; Technical Specification Group GSM/EDGE Radio Access Network; Generic Access Network (GAN); Stage 2 (Release 10)," 3GPP TS 43.318 V10.1.0 (Mar. 2011) *Technical Specification*, 2011, pp. 1-128, 3GPP Organizational Partners, Valbonne, France.

International Search Report issued Mar. 1, 2012, in corresponding International Patent Application No. PCT/CN2011/074982.

"3rd Generation Partnership Project; Technical Specification Group Services and System Aspects; Architecture enhancements for non-3GPP accesses; (Release 10)," 3GPP TS 23.402 V10.3.0 (Mar. 2011) *Technical Specification*, 2011, pp. 1-229, 3GPP Organizational Partners, Valbonne, France.

Extended European Search Report issued in May 15, 2014 in corresponding European Application No. 11 79 5095.

\* cited by examiner

DATA TRANSMISSION METHOD, OFFLOADING POINT DEVICE, USER EQUIPMENT, AND SYSTEM

CROSS-REFERENCE TO RELATED APPLICATIONS

This application is a continuation of International Application No. PCT/CN2011/074982, filed on May 31, 2011, which is hereby incorporated by reference in its entirety.

FIELD OF THE INVENTION

The present invention relates to the field of communications, and in particular, to a data transmission method, an offloading point device, a user equipment, and a system.

BACKGROUND OF THE INVENTION

With the rapid development of smart phones, more and more mobile communication terminals are integrated with wireless local area network (WLAN, Wireless Local Area Network) communication modules, such as WiFi (Wireless Fidelity, wireless fidelity) modules. On the other hand, with constant increase of requirements of people on the mobile broadband, the current wireless cell communication system bears the increasingly greater pressure of data traffic. In a feasible method, the wireless cell technology and the WLAN technology are integrated into each other, and a WLAN is used to divert part of data traffic of a mobile cell communication system, thereby greatly improving user experience of a cellular system.

Many solutions are available for integrating a cellular network with a WLAN, and the simplest one is an independent WLAN networking solution characterized by AP (access point, Access Point)+AC (AP controller, AP Controller). An AP is an access point of a WLAN. After an association and authorization process, a WLAN terminal may communicate with the AP. An AC has functions of routing and switching as well as managing the AP. An external interface of the AP is an IP interface. Therefore, through the AC, a user IP data packet from the AP may enter an external IP packet network, typically the Internet (the Internet). In order to perform authentication, authorization, and accounting on a user, the AC is connected to an AAA server (authentication, authorization and accounting; Authentication, Authorization and Accounting). Normally, the user accesses a WLAN network by inputting an account name and a password provided by an operator. Alternatively, a 3GPP AAA server in a mobile communication network, such as GPRS, UMTS or LTE, of a mobile operator performs authentication, authorization, and accounting. The 3GPP AAA server is connected to an HLR (Home Location Register, home location register). In this way, manual operations, such as inputting an account name and a password, are not required, instead, a mobile phone uses user subscription information stored in a SIM (Subscriber Identity Module, subscriber identity module) card or a USIM (Universal Subscriber Identity Module, universal subscriber identity module) card to automatically perform authentication and authorization operations of the user, thereby greatly simplifying and facilitating use of the WLAN network by the user.

Although the networking solution of an independent WLAN is simple, the networking solution supports neither interworking with the mobile communication network nor reuse of existing devices in the mobile communication network such as GPRS, UMTS, or LTE. The interworking not supported includes: handover between the WLAN and the mobile communication network, and accessing a PS (Packet-Switched Domain, packet-switched domain) service such as an IMS (IP Multimedia Subsystem, IP multimedia subsystem) service through the WLAN. The unlicensed spectrum used by the WLAN is vulnerable to different types of interference, and the WLAN AP is generally set up in hotspot areas, instead of being networked to provide continuous coverage. Therefore, when the WLAN is unavailable due to interference, or, when the UE leaves the coverage area of the AP, it is very important to hand over the UE to a mobile communication network such as GPRS, UMTS, or LTE. Therefore, an I-WLAN (Interworking WLAN, interworking WLAN) networking manner of 3GPP may be used.

Taking GPRS and UMTS systems as an example, an AC is connected to a GGSN (Gateway GPRS Support Node, gateway GPRS support node) through a TTG (Tunnel Terminating Gateway, tunnel terminating gateway). The GGSN is a gateway between the GPRS and UMTS systems and an external IP network, and the TTG is connected to the GGSN through a standard Gn interface of the 3GPP. In this way, the WLAN is connected with the GGSN through the TTG to implement interworking with the mobile communication network such as GPRS, UMTS, or LTE and reuse the existing functions of the mobile communication network such as authentication, authorization, accounting, policy control/traffic policing. Alternatively, a TG function and a GGSN function may be combined into a PDG (Packet Data Gateway, packet data gateway).

Based on the I-WLAN manner, the 3GPP further proposes IFOM (IP Flow Mobility and Seamless WLAN Offloading, IP flow mobility and seamless WLAN offloading) in Release 10, so as to further improve user experience, which is mainly characterized in that a UE (User Equipment, user equipment) is allowed to use a mobile communication network, such as GPRS, UMTS, or LTE, and an I-WLAN network to transmit different IP data streams of the UE, thereby realizing more flexible data offloading and increasing a peak rate of a user.

For the independent WLAN and I-WLAN, the existing WLAN networking modes have a common characteristic that the WLAN is a completely independent network. Therefore, mobile operators who have no fixed network resources need to construct a new transmission network for the WLAN, which increases the period and cost of network construction.

SUMMARY OF THE INVENTION

Embodiments of the present invention provide a data transmission method, an offloading point device, a user equipment, and a system, so as to increase a transmission rate of a system.

On one aspect, a data transmission method is provided, which includes: receiving offloading control signaling sent by a user equipment, where the offloading control signaling carries a cellular network identifier and a wireless local area network WLAN identifier of the user equipment; according to the cellular network identifier and the WLAN identifier of the user equipment, establishing correspondence between the WLAN identifier of the user equipment and all bearer channels of the user equipment; and according to a data offloading manner determined by negotiating with the user equipment and the correspondence, the data offloading manner being used to designate all or a part of user data streams in a downlink and/or uplink direction of the user equipment that are transmitted through a WLAN air interface, determining a bearer channel corresponding to all or a part of the user data streams.

On another aspect, a data transmission method is provided, which includes: sending offloading control signaling to an offloading point device, where the offloading control signaling carries a cellular network identifier and a wireless local area network WLAN identifier of a user equipment, so that the offloading point device establishes correspondence between the WLAN identifier of the user equipment and all bearer channels of the user equipment according to the cellular network identifier and the WLAN identifier of the user equipment; and negotiating with the offloading point device to determine a data offloading manner, where the data offloading manner is used to designate all or a part of user data streams in a downlink and/or uplink direction of the user equipment that are transmitted through a WLAN air interface, so that the offloading point device determines, according to the data offloading manner and the correspondence, a bearer channel corresponding to all or a part of the user data streams.

On another aspect, an offloading point device is provided, which includes: a receiving unit, configured to receive offloading control signaling sent by a user equipment, where the offloading control signaling carries a cellular network identifier and a wireless local area network WLAN identifier of the user equipment; an establishing unit, configured to establish correspondence between the WLAN identifier of the user equipment and all bearer channels of the user equipment according to the cellular network identifier and the WLAN identifier of the user equipment; and a determining unit, configured to, according to a data offloading manner determined by negotiating with the user equipment and the correspondence, the data offloading manner being used to designate all or a part of user data streams in a downlink and/or uplink direction of the user equipment that are transmitted through a WLAN air interface, determine a bearer channel corresponding to all or a part of the user data streams.

On another aspect, a user equipment is provided, which includes: a sending unit, configured to send offloading control signaling to an offloading point device, where the offloading control signaling carries a cellular network identifier and a wireless local area network WLAN identifier of the user equipment, so that the offloading point device establishes correspondence between the WLAN identifier of the user equipment and all bearer channels of the user equipment according to the cellular network identifier and the WLAN identifier of the user equipment; and a negotiating unit, configured to negotiate with the offloading point device to determine a data offloading manner, where the data offloading manner is used to designate all or a part of user data streams in a downlink and/or uplink direction of the user equipment that are transmitted through the WLAN air interface, so that the offloading point device determines, according to the data offloading manner and the correspondence, a bearer channel corresponding to all or a part of the user data streams.

On another aspect, a communication system is provided, which includes the aforementioned offloading point device or the aforementioned user equipment.

In the embodiments of the present invention, a bearer channel corresponding to all or a part of user data that is transmitted through the WLAN air interface is determined, so as to transmit all or a part of the user data through the WLAN air interface in the uplink or downlink direction, thereby increasing a transmission rate.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In an embodiment of the present invention, by means of tight coupling, a WLAN is used as the natural extension of and a supplement to an LTE mobile communication network, so that the WLAN becomes a part of a mobile communication network such as LTE, without the need of forming two networks, so as to reduce the period and cost of network construction, thereby dramatically increasing a transmission rate of a mobile communication network user and effectively improving user experience.

It should be noted that, the WLAN is used to transmit a part or all of user data which originally needs to be transmitted through a cellular network, so as to achieve the effect of alleviating the pressure of data transmission on the cellular network, which is generally called offloading. If air interfaces of the WLAN and a cellular system can be used to transmit the user data at the same time, not only the effect of reducing the load of data transmission on the cellular network, namely, offloading, is achieved, but also the effect of improving a peak rate of a user and user experience is achieved, which is therefore also called converged transmission of the WLAN and the cellular system in the embodiment of the present invention.

Figure 1:
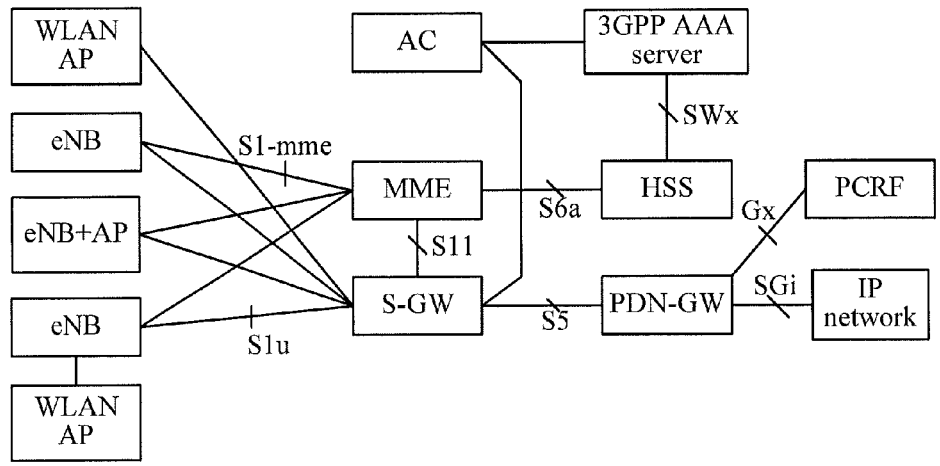
FIG. 1 is a schematic diagram of a tightly coupled network architecture of LTE and a WLAN that can apply an embodiment of the present invention.

FIG. 1 is a schematic diagram of a tightly coupled network architecture of LTE and a WLAN that can apply an embodiment of the present invention. An MME (Mobility Management Entity, mobility management entity), an S-GW (Serving Gateway, serving gateway), a PDN-GW (Packet Data Network Gateway, packet data network gateway), a PCRF (Policy charging and rules function, Policy Charging and Rules Function), an HSS (Home Subscriber Server, home subscriber server), a 3GPP AAA Server and so on shown in FIG. 1 may be LTE core network EPC (Evolved Packet Core, evolved packet core) network elements defined by an existing 3GPP protocol system. The MME and the S-GW are connected through an S11 interface, and the S-GW is connected to the PDN-GW through an S5 interface. The PDN-GW is connected to an external packet data network (for example, an IP network) through an SGi interface, and is connected to the PCRF through a Gx interface. The MME is further connected to the HSS through an S6a interface. The 3GPP AAA Server is connected to the HSS through an SWx interface.

There is only one LTE wireless access network element, namely, an eNB (evolved Node B, evolved Node B). The eNB is connected to the MME and the S-GW through a control plane interface S1-mme and a user plane interface S1 u, respectively. A transport layer protocol of the control plane S1-mme interface is an SCTP (Stream Control Transmission Protocol, stream control transmission protocol). A transport layer protocol of the user plane S1u interface is a GTP-U (GPRS Tunneling Protocol—User plane, GPRS tunneling protocol—user plane) protocol borne on a UDP. That is to say, user data is borne in a GTP-U tunnel. The GTP-U tunnel is uniquely identified by a combination of a TEID (Tunnel Endpoint Identifier, tunnel endpoint identifier) of a GTP-U header, a UDP port number of a UDP/IP layer, and an IP address. For convenience of description, in the following, the combination that is used to identify the GTP-U tunnel and is formed by the TEID, the UDP port number of the UDP/IP layer and the IP address is called a GTP-U tunnel identifier.

In the embodiment of the present invention, a user data offloading function may be located in the S-GW or in the eNB. In other words, in the embodiment of the present invention, an offloading point device may be an S-GW or an eNB. Description is provided below through an example in which the offloading point device is an S-GW. That is, in addition to having relevant functions defined by an existing 3GPP protocol system, the S-GW further has a function of performing offloading on a user data stream between LTE and a WLAN. That is, user plane data is transmitted through a WLAN channel and/or an LTE channel, and a control plane message is still transmitted through the LTE channel. In the description of the embodiment of the present invention, when distinguishing is not required, a term "offloading point device" is used to refer to a network element having a user data offloading function, for example, an evolved Node B eNB or a serving gateway S-GW.

As shown in FIG. 1, a WLAN AP is logically connected to an S-GW. Specifically, the WLAN AP may share a station address with an eNB, and is connected to the S-GW. Alternatively, the WLAN AP does not share a station address with an eNB, but is connected to the S-GW through the eNB. Alternatively, the WLAN AP does not share a station address with an eNB, and is directly connected to the S-GW. When the WLAN AP shares a station address with the eNB, the WLAN AP and the eNB may be the same physical device, that is, the eNB is meanwhile integrated with functions of the WLAN AP, and the WLAN AP and the eNB may be two independent physical devices. Logical interfaces between the S-GW and the WLAN AP are divided into a control plane and a user plane. The control plane is used to transmit information related to management and control of the user plane to manage a user plane transmission channel between the S-GW and the WLAN AP, and may adopt a TCP over IP or SCTP over IP manner to perform transmission. The user plane is used to transmit a user data stream that is offloaded to the WLAN AP and transmitted through a WLAN network, and may adopt a UDP over IP manner to perform transmission.

As shown in FIG. 1, an AC (WLAN AP Controller, WLAN AP controller) is connected to the S-GW. A logical interface exists between the AC and each WLAN AP, and transmission may be performed through TCP over IP or SCTP over IP, the logical interface is mainly used to transmit WLAN related management and control information, so as to perform WLAN related management and control such as performing security authentication on a WLAN AP connected to the logical interface, network management, and coordination and management of interference between WLAN APs. The AC is connected to an AAA server, so as to perform access authentication on a WLAN user. The AAA server is preferably a 3GPP AAA Server. A connection manner is the same as a connection manner between an AC or a TTG and an AAA server in the aforementioned existing WLAN network.

Figure 2:
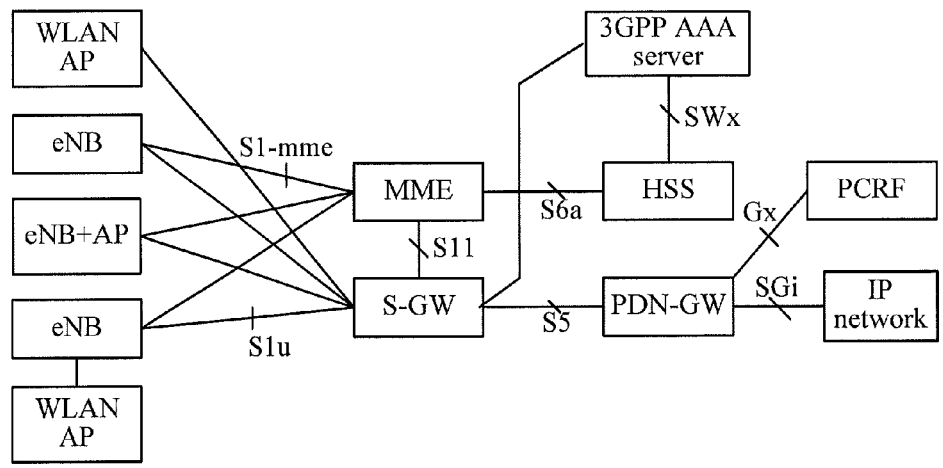
FIG. 2 is a schematic diagram of another tightly coupled network architecture of LTE and a WLAN that can apply an embodiment of the present invention.

FIG. 2 is a schematic diagram of another tightly coupled network architecture of LTE and a WLAN that can apply an embodiment of the present invention. Different from the architecture shown in FIG. 1, in the architecture of FIG. 2, the AC does not act as an independent device, and functions of the AC and WLAN related management and control functions are integrated in the S-GW, so that the S-GW is connected to the AAA server to perform access authentication on a WLAN user.

As shown in FIG. 1 and FIG. 2, when an offloading point device is the S-GW, because the S-GW has the function of collecting accounting information, the S-GW may make statistics on information such as user data traffic passing through an LTE air interface and user data traffic passing through a WLAN air interface and respective durations, and provide the information to an offline or online accounting system, so that the system can perform a required accounting function. When an offloading point device is the eNB, a function of collecting accounting information needs to be added to the eNB, so that the eNB may make statistics on information such as user data traffic passing through an LTE air interface and user data traffic passing through a WLAN air interface and respective durations, and provide the information to an offline or online accounting system, so that the system can perform a required accounting function.

The difference between the tightly coupled network architectures of the LTE and the WLAN shown in FIG. 1 and FIG. 2 lies in that locations of WLAN related management and control functions are different. However, with respect to functions related to converged transmission of the LTE and the WLAN, the architectures shown in FIG. 1 and FIG. 2 have no difference, so the following description related to offloading of user data between the LTE and the WLAN is applicable to the architectures shown in FIG. 1 and FIG. 2.

Figure 3A:
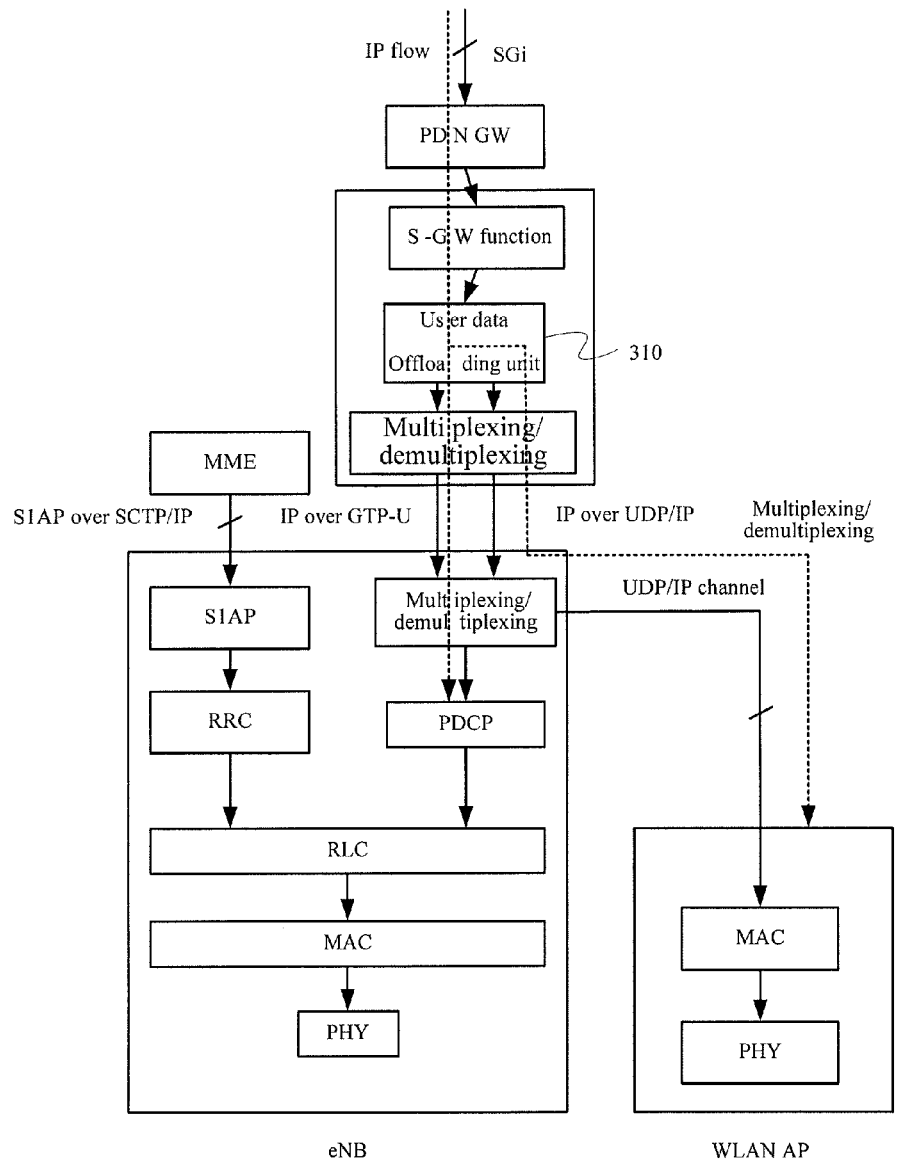
FIG. 3A and FIG. 3B are schematic diagrams of user data transmission flows.

A user data offloading process is illustrated below through an example. In the following example, an offloading point device performs downlink offloading, and uplink convergence performed by an offloading point device is opposite to the downlink offloading, and therefore details are not repeated herein. FIG. 3A is a schematic diagram of a user data transmission flow when a WLAN AP does not share a station address with an eNB but is connected to an S-GW through the eNB, in which dashed arrows represent the transmission process of an IP flow. Taking a downlink direction as an example, user data arrives at a PDN-GW through an SGi interface, arrives at an S-GW through a GTP-U tunnel, passes through an S-GW function unit, and is then divided into two parts by a user data offloading unit 310. The part of user data that is transmitted through an LTE air interface is sent to an eNB through a GTP-U channel, and is sent by the eNB to a UE through the LTE air interface. The part that is transmitted through a WLAN air interface is directly transmitted to a WLAN AP, or is forwarded to the WLAN AP through an eNB (when the WLAN AP and the eNB do not share a station address, and the WLAN AP is connected to an S-GW through the eNB), and is transmitted by a MAC layer and a physical layer of a WLAN through the WLAN air interface.

A transport layer packet of an interface between the S-GW and the WLAN AP (including a TCP over IP packet for bearing a control plane and a UDP over IP packet for bearing the part of the user data that is transmitted through the WLAN air interface) between the S-GW and the eNB may be transmitted by segment in the following two manners. In one manner, the transport layer packet of the interface between the S-GW and the WLAN AP is directly transmitted. Taking a downlink direction as an example, a source address and a destination address of an IP header are the S-GW and the WLAN AP, respectively, which requires the eNB (when the WLAN AP and the eNB do not share a station address) to have an IP layer routing function, so that user data transmitted through the WLAN AP can be correctly forwarded according to an IP address of the WLAN AP. The IP layer routing function may also be performed by an external IP routing device.

In the other manner, a UDP over IP tunnel between the S-GW and the eNB is adopted. As shown in FIG. 3A, in an embodiment, both an S-GW side and an eNB side have multiplexing/demultiplexing operations, so that an S1u interface packet and a transport layer packet of the interface between the S-GW and the WLAN AP are borne on different transmission channels, and then are multiplexed on a physical line of an S1u interface, so that the packets both can be transmitted through the S1u interface Taking the downlink direction as an example, a transport layer packet of the interface between the S-GW and the WLAN AP is borne on a UDP over IP tunnel of the physical line of the S1u interface, where the UDP port number is different from a UDP port number of a GTP-U channel of the S1u interface, so that multiplexing/demultiplexing operations on an eNB side can separate two paths of data that are multiplexed. When the WLAN AP and the eNB do not share a station address, that is, the eNB is connected to multiple WLAN APs, the UDP port numbers are used to distinguish different WLAN APs, that is, the eNB forwards a transport layer packet of the interface between the S-GW and the WLAN AP that is borne on a corresponding UDP port to a corresponding WLAN AP according to a UDP port number. The multiplexing/demultiplexing operations not only can be performed by the S-GW and the eNB, but also can be performed by an external device. A process of an uplink direction is opposite to the process of the downlink direction, and is not repeated herein.

Figure 3B:
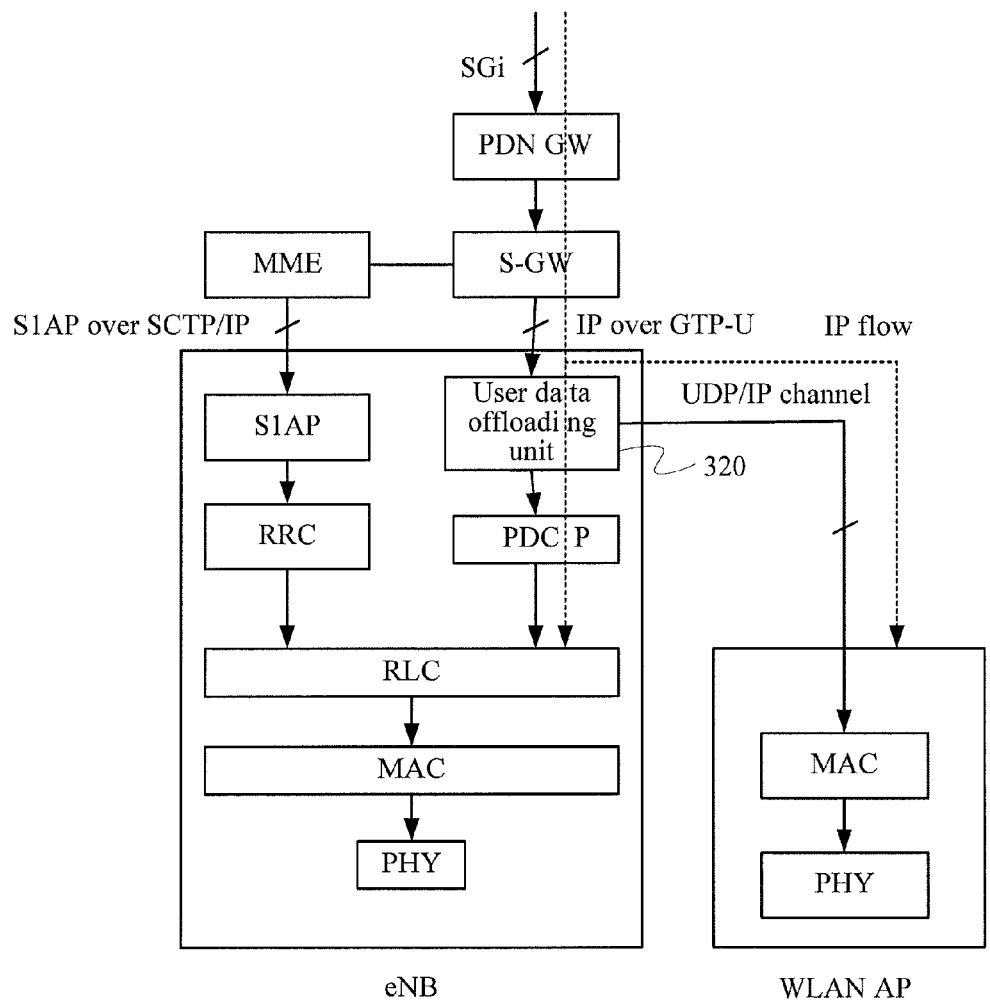

FIG. 3B illustrates implementation of a user data offloading function in an eNB, in which dashed arrows represent the transmission process of an IP flow. Downlink user data arrives at a PDN-GW through an SGi interface, and passes through a GTP-U tunnel, and then arrives at an eNB through an S-GW. The user data that arrives at the eNB first enters a user data offloading unit 320. The user data offloading unit 320 divides downlink data streams of a UE into two parts, which are transmitted through LTE and WLAN air interfaces, respectively. The part that is transmitted through the LTE air interface is completely the same as a standard LTE protocol. The part that is transmitted through the WLAN air interface is first transmitted to a WLAN AP (when the WLAN AP and the eNB do not share a station address) through a line between the eNB and the WLAN AP, and then transmitted by a MAC layer and a physical layer of a WLAN through the WLAN air interface. A process of an uplink direction is opposite to the process of the downlink direction, and is not repeated herein.

Figure 4:
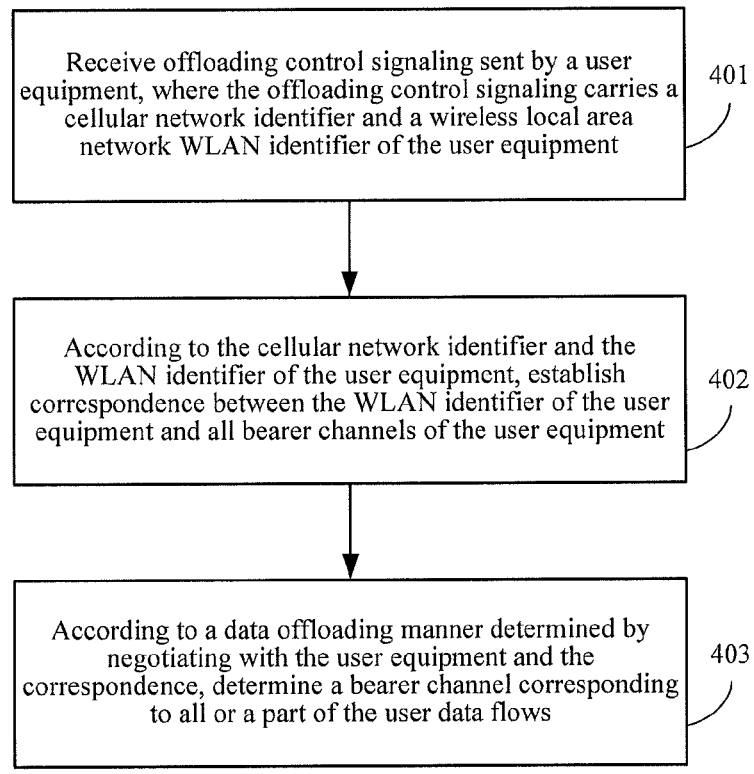
FIG. 4 is a flow chart of a data transmission method according to an embodiment of the present invention.

FIG. 4 is a flow chart of a data transmission method according to an embodiment of the present invention. The method in FIG. 4 is executed by an offloading point device (such as an eNB and an S-GW).

401: Receive offloading control signaling sent by a user equipment, where the offloading control signaling carries a cellular network identifier and a wireless local area network WLAN identifier of the user equipment.

402: According to the cellular network identifier and the WLAN identifier of the user equipment, establish correspondence between the WLAN identifier of the user equipment and all bearer channels of the user equipment.

403: According to a data offloading manner determined by negotiating with the user equipment and the correspondence, the data offloading manner being used to designate all or a part of user data streams in a downlink and/or uplink direction of the user equipment that are transmitted through a WLAN air interface, determine a bearer channel corresponding to all or a part of the user data streams.

In the embodiment of the present invention, the bearer channel corresponding to all or a part of user data that is transmitted through the WLAN air interface is determined, so as to transmit all or a part of the user data through the WLAN air interface in the uplink or downlink direction, thereby increasing a transmission rate.

Figure 5:
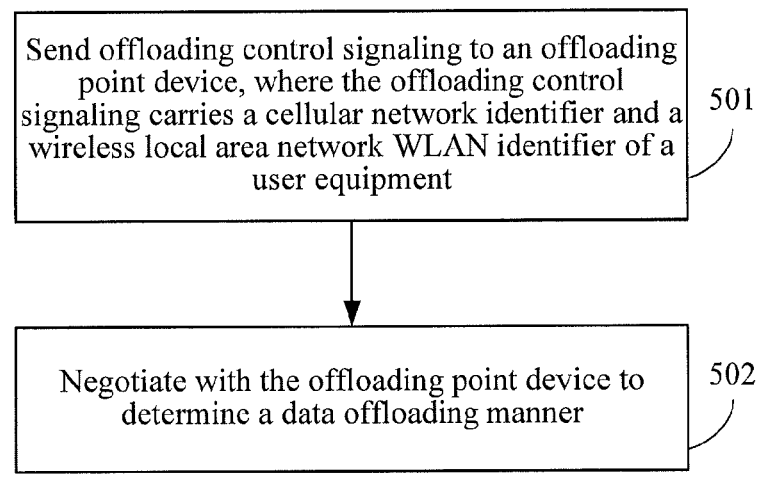
FIG. 5 is a flow chart of a data transmission method according to an embodiment of the present invention.

FIG. 5 is a flow chart of a data transmission method according to an embodiment of the present invention. The method in FIG. 5 is executed by a user equipment (for example, a UE or a terminal of another type), and corresponds to the method in FIG. 4.

501: Send offloading control signaling to an offloading point device, where the offloading control signaling carries a cellular network identifier and a wireless local area network WLAN identifier of a user equipment, so that the offloading point device establishes correspondence between the WLAN identifier of the user equipment and all bearer channels of the user equipment according to the cellular network identifier and the WLAN identifier of the user equipment.

502: Negotiate with the offloading point device to determine a data offloading manner, where the data offloading manner is used to designate all or a part of user data streams in a downlink and/or uplink direction of the user equipment that are transmitted through the WLAN air interface, so that the offloading point device determines, according to the data offloading manner and the correspondence, a bearer channel corresponding to all or a part of the user data streams.

In the embodiment of the present invention, the bearer channel corresponding to all or a part of user data that is transmitted through the WLAN air interface is determined, so as to transmit all or a part of the user data through the WLAN air interface in the uplink or downlink direction, thereby increasing a transmission rate.

In the embodiment of the present invention, an example of the cellular network identifier transmitted in 401 and 501 is an IMSI (International Mobile Subscriber Identity, international mobile subscriber identity), and an example of the WLAN identifier is a WLAN MAC (Media Access Control, media access control) address.

The offloading control signaling in 401 and 501 may be application layer offloading control signaling that is transmitted between a user equipment and an offloading point device through an application layer of an LTE air interface. In another embodiment, when the offloading point device is an S-GW, the offloading control signaling may be transferred through an NAS (Non-Access-Stratum, non-access-stratum) message. Alternatively, when the offloading point device is an evolved Node B eNB, the offloading control signaling may be transferred through an RRC (Radio Resource Control, radio resource control) message. The description below is provided by taking application layer offloading control signaling as an example, but the embodiment of the present invention is not limited thereto. An NAS protocol between a UE and an S-GW in existing standards may be expanded directly, to add all functions performed by application layer offloading control signaling between a UE and an S-GW in the present invention, so that offloading control related information between a UE and an S-GW in the present invention may be transmitted by using NAS signaling. Similarly, when a user data offloading function is located in an eNB, an RRC protocol between a UE and an eNB in existing standards may be expanded directly, that is, RRC signaling is used for transmission.

Further, in addition to transmitting the cellular network identifier and the WLAN identifier of the UE, the offloading control signaling transmitted between the UE and the offloading point device may also be used for functions such as WLAN discovery, authentication and mobility management, which is described below in detail.

The application layer offloading control signaling may be transmitted through an EPS (Evolved Packet System, evolved packet system) bearer. The EPS bearer may be one of one or more EPS bearers established by an LTE network control plane function according to a standard LTE protocol. In an LTE system, a UE may be connected to multiple PDNs (Packet Data Networks, packet data networks), and a PDN connection at least includes an EPS bearer. An EPS bearer is a basic unit for an LTE network to perform QoS (quality of service) control. That is, for service data streams mapped to a same EPS bearer, same packet forwarding processing (such as a scheduling policy, a queue management policy, a rate adjustment policy, and RLC configuration) is adopted. In order to separate a traffic flow transmitted on each EPS bearer from application layer data, each EPS bearer corresponds to a TFT (Traffic Flow Template, traffic flow template). The TFT is a group of packet filters (packet filter). Each packet filter typically includes characteristics such as an IP address of an accessed remote server, a protocol type, and a port range, and is used to match and separate IP packets having the same characteristics. Therefore, the TFT can divide a user data stream into multiple IP flows, which are transmitted through different EPS bearers, respectively.

Figure 6:
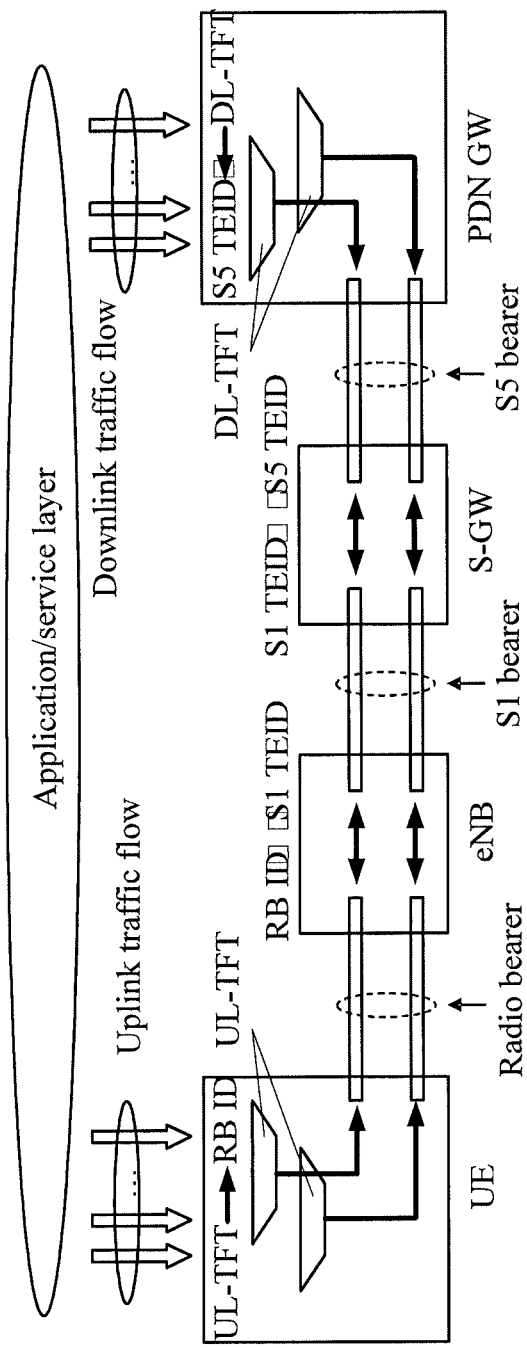
FIG. 6 is a schematic diagram of an EPS bearer in an LTE system.

FIG. 6 is a schematic diagram of an EPS bearer in an LTE system. An EPS bearer in the uplink or downlink direction is formed segment by segment by a radio bearer from a UE to an eNB, an S1 bearer from the eNB to an S-GW, and an S5 bearer from the S-GW to a PDN-GW. The radio bearer from the UE to the eNB and the S1 bearer from the eNB to the S-GW are collectively referred to as an E-RAB (E-UTRAN Radio Access Bearer, E-UTRAN radio access bearer). The S5 bearer from the S-GW to the PDN-GW and the S1 bearer from the eNB to the S-GW are both GTP-U tunnels.

In the uplink direction, the UE adopts an uplink traffic flow template (UL-TFT) to perform matching on each packet from an application layer, to divide the packets into different uplink IP flows, and sends the uplink IP flows through corresponding uplink EPS bearers. Therefore, the UE stores an identifier, that is, an uplink E-RAB ID, which is uniquely corresponding to each uplink EPS bearer of the UE. The S-GW also takes an uplink E-RAB ID to correspond to an uplink EPS bearer of the UE, and the S-GW also stores an S1 interface GTP-U tunnel identifier uniquely corresponding to the uplink E-RAB ID. Therefore, when the UE is connected to multiple PDNs at the same time, an uplink E-RAB ID can uniquely correspond to an uplink IP flow of a PDN connection.

In the downlink direction, after a downlink packet of a peer application layer arrives at the PDN-GW through an external packet data network, the PDN-GW uses a downlink TFT (DL-ITT) to perform matching on each downlink packet, to divide the downlink packets into different downlink IP flows, and sends the downlink IP flows through corresponding downlink EPS bearers. Similarly, the S-GW and the UE both take a downlink E-RAB ID to uniquely correspond to a downlink EPS bearer of the UE, and the S-GW also stores an S1 interface GTP-U tunnel identifier uniquely corresponding to the downlink E-RAB ID. Therefore, when the UE is connected to multiple PDNs at the same time, a downlink E-RAB ID uniquely corresponds to a downlink IP flow of a PDN connection.

EPS bearers are formed by a default bearer and a dedicated bearer. The default bearer is established during network attachment (Network Attachment), and the dedicated bearer is a bearer added based on the default bearer. If the UE has no pre-allocated static IP address, the UE may request a network to allocate an IP address during network attachment. Different EPS bearers of the same PDN connection have a same IP address. Once the UE succeeds in network attachment, the UE enters an EMM-REGISTERED state, the EPS bearer is in an active state, the GTP-U tunnels of the S1 interface and the S5 interface are open, and a user data packet may be transmitted between the eNB and the PDN-GW.

In the embodiment of the present invention, a control plane function of an LTE network may establish one or more EPS bearers of a user plane according to a standard LTE protocol. In the downlink direction, the eNB maps a radio bearer of each EPS bearer into an LTE radio link, or a WLAN radio link, or LTE and WLAN radio links provided at the same time. In the uplink direction, the UE maps a radio bearer of each EPS bearer into an LTE radio link, or a WLAN radio link, or LTE and WLAN radio links provided at the same time. Control plane messages (including NAS and AS messages) are still transmitted through an LTE air interface, but a data plane message may be partially or completely transmitted through a WLAN air interface.

That is to say, in the embodiment of the present invention, an EPS bearer is expanded, so that the radio bearer part of the EPS bearer may be an LTE radio link, or a WLAN radio link, or LTE and WLAN radio links provided at the same time. The EPS bearers described below all refer to EPS bearers expanded in the present invention, and are not limited to the definition in the original LTE protocol that the radio bearer part of the EPS bearer is only an LTE radio link.

As stated above, a user data offloading function can be located not only in the S-GW but also in the eNB. For convenience of description, illustration is provided below by taking an example in which the user data offloading function is located in the S-GW. However, with respect to LTE and WLAN converged transmission related functions, there is no difference between locating the user data offloading function in the S-GW and locating the user data offloading function in the eNB. Therefore, the following description of performing offloading on user data between the LTE and the WLAN is applicable to both the case where the user data offloading function is located in the S-GW and the case where the user data offloading function is located in the eNB.

Negotiation of the data offloading manner may be initiated by a user equipment, or may be initiated by an offloading point device, which is not limited by the present invention. According to the present invention, in order to control the data offloading manner, the UE may negotiate with the offloading point device (for example, an eNB or an S-GW) through the application layer offloading control signaling.

A data offloading method of the present invention is described below with reference to specific embodiments.

Embodiment 1

Existing TFT Functions of LTE are Used

In this embodiment, in 403 in FIG. 4, the determining the bearer channel corresponding to all or a part of the user data streams includes: according to the determined data offloading manner, establishing an end-to-end tunnel, running through a wireless local area network WLAN air interface, to the user equipment, the end-to-end tunnel being used to transmit all or a part of the user data streams, and establishing correspondence between a tunnel number of the end-to-end tunnel and an E-RAB ID corresponding to the bearer channel (for example, a GTP-U tunnel shown in FIG. 6). In this way, for a user data stream (for example, an IP flow) that needs to be transmitted through the WLAN air interface, the offloading point device may transmit the user data stream to the user equipment through the end-to-end tunnel. On the other hand, when an uplink user data stream from the user equipment is received through the end-to-end tunnel, the offloading point device can also learn through which bearer channel the uplink user data stream is forwarded.

In the embodiment, an existing IP flow bearing mechanism of LTE is applied, that is, in the downlink direction, the PDN-GW uses an existing DL-TFT function to divide downlink user data of the UE into different downlink IP flows (IP Flow). The downlink IP flows in a core network arrive at the S-GW through corresponding downlink GTP-U tunnels (an example of the bearer channel). The S-GW connects a part or all of the downlink GTP-U tunnels that bear the downlink IP flows to corresponding downlink WLAN radio bearers, and connects the rest of the downlink GTP-U tunnels that bear the downlink IP flows to corresponding downlink LTE radio bearers, so that a part or all of the downlink IP flows are offloaded to the WLAN air interface, thereby realizing offloading and converged transmission of downlink user data at the LTE and WLAN air interfaces.

In the uplink direction, the UE uses an existing UL-TFT function to divide uplink user data of the UE into different uplink IP flows. The S-GW connects a part or all of uplink GTP-U tunnels that bear the uplink IP flows to corresponding uplink WLAN radio bearers, and connects the rest of the uplink GTP-U tunnels that bear the uplink IP flows to corresponding uplink LTE radio bearers, so that as long as the UE sends a part or all of the uplink IP flows through corresponding uplink WLAN radio bearers, and sends the rest of the uplink IP flows through corresponding uplink LTE radio bearer, the S-GW can forward a part or all of the uplink IP flows that are borne by the uplink WLAN radio to corresponding uplink GTP-U tunnels, and forward the rest of the uplink IP flows that are borne by the uplink LTE radio to corresponding uplink GTP-U tunnels, thereby realizing offloading and converged transmission of uplink user data at the LTE and WLAN air interfaces.

That is to say, the S-GW needs to perform the operation of connecting a part or all of the GTP-U tunnels of the UE to the WLAN radio bearers of the UE for the UE, which includes: in the uplink direction, connecting a part or all of the GTP-U tunnels that bearer the uplink IP flows to the corresponding uplink WLAN radio bearers and connecting the rest of the GTP-U tunnels that bear the uplink IP flows to the corresponding uplink WLAN radio bearers; and in the downlink direction, connecting a part or all of the GTP-U tunnels that bear the downlink IP flows to the corresponding downlink WLAN radio bearers and connecting the rest of the GTP-U tunnels that bear the downlink IP flows to the corresponding downlink WLAN radio bearers.

The WLAN AP uses a MAC address of a UE to uniquely identify the UE, and a user plane interface between the S-GW and the WLAN AP may use UDP port numbers to distinguish different UEs. Therefore, the WLAN AP and the S-GW may establish correspondence between the MAC address of the UE and a corresponding UDP port number of the user plane interface between the S-GW and the WLAN AP. In this way, any uplink data packet from the UE of the MAC address is received by the WLAN AP and sent through a corresponding UDP port to the S-GW. According to the correspondence between the UDP port number of the user plane interface between the S-GW and the WLAN AP and the MAC address of the UE, the S-GW uses the UDP port number to make the uplink data packet correspond to the bearer channel (for example, a GTP-U tunnel) of the corresponding UE.

Meanwhile, the S-GW sends a downlink data packet, which needs to be transmitted through the WLAN air interface, of the UE to the WLAN AP through the UDP port according to the correspondence between the UDP port number of the user plane interface between the S-GW and the WLAN AP and the MAC address of the UE. The WLAN AP receives a downlink data packet that is transmitted through a certain UDP port and is from the S-GW, and searches for the MAC address of the corresponding UE according to a number of the UDP port, so as to send the downlink data packet to the UE of the corresponding MAC address through the WLAN air interface.

As stated above, the S-GW can only obtain the UDP port number or information of a WLAN MAC address of the UE from the interface of the S-GW and the WLAN AP. Corresponding to the bearer channels of the corresponding UE, the S-GW needs to establish correspondence between the WLAN MAC address of the UE and all bearer channels of the UE.

Therefore, the UE informs the S-GW of the correspondence between the IMSI of the UE and the WLAN MAC address of the UE through application layer offloading control signaling between the UE and the S-GW, where the IMSI is a unique identifier of a UE in a mobile cellular network. The S-GW stores the correspondence between an IMSI of each UE and all bearer channels of the UE. In this way, by using the IMSI and the WLAN MAC address of the UE, the S-GW may establish correspondence between the WLAN MAC address of the UE and all the bearer channels of the UE.

Meanwhile, the WLAN air interface does not distinguish a part or all of IP flows of the UE that are transmitted through the WLAN air interface, so that in order to enable the UE to distinguish different IP flows of the UE in the downlink direction that are transmitted through the WLAN air interface, and to enable the S-GW to distinguish different IP flows of the UE in the uplink direction and send all the IP flows to corresponding GTP-U tunnels, the S-GW and the UE further need to establish the consistent correspondence between a part or all of the IP flows that are transmitted through the WLAN air interface and the corresponding bearers. Therefore, in this embodiment, the UE and the S-GW establish multiple end-to-end tunnels. An end-to-end tunnel is used to transmit an IP flow of the UE that is transmitted through the WLAN air interface. Therefore, according to tunnel numbers of the end-to-end tunnels between the UE and the S-GW, the S-GW and the UE can determine the correspondence between a part or all of the IP flows that are transmitted through the WLAN air interface and the corresponding bearers.

As stated above, the UE and the S-GW each store an EPS bearer identifier of each UE, that is, an E-RAB ID, which corresponds to a corresponding EPS bearer. That is to say, as long as the UE and the S-GW succeed in negotiating, through the application layer offloading control signaling between the UE and the S-GW, the correspondence between the tunnel numbers of the end-to-end tunnels between the UE and the S-GW and the E-RAB IDs of the corresponding bearers, where the end-to-end tunnels are used to transmit a part or all of the IP flows through the WLAN air interface. The S-GW and the UE may determine, according to the correspondence, the correspondence between a part or all of the IP flows that are transmitted through the WLAN air interface and the corresponding bearers.

In this way, in the uplink direction, the S-GW may distinguish different PDN connections of a same UE and uplink IP flows on different EPS bearers of a same PDN connection according to tunnel numbers, so as to send the uplink IP flows to the PDN-GW through the GTP-U tunnels of the corresponding S5 interface; in the downlink direction, the S-GW sends downlink IP flows of the UE from different GTP-U tunnels to the UE through corresponding end-to-end tunnels between the UE and the S-GW and through the WLAN air interface, so that the UE can distinguish different PDN connections of the UE according to the tunnel numbers of the end-to-end tunnels between the UE and the S-GW.

Figure 7A:
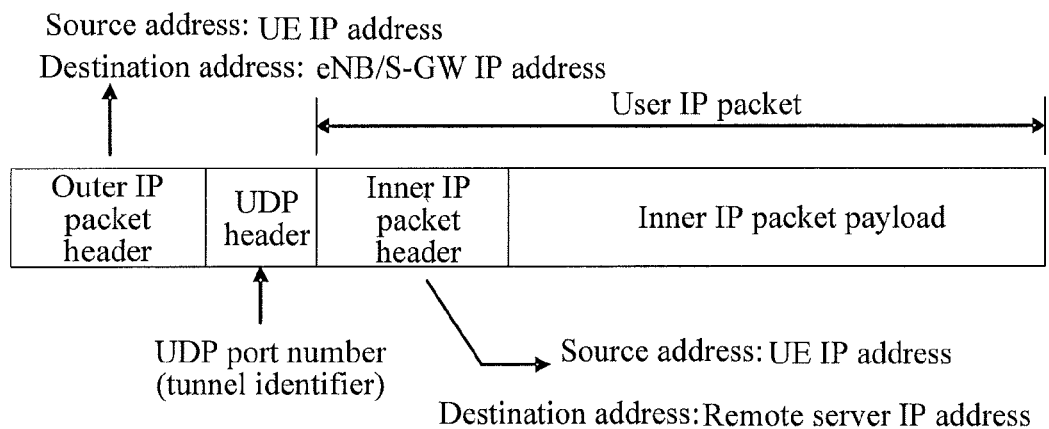
FIG. 7A and FIG. 7B are schematic diagrams of an end-to-end tunnel according to an embodiment of the present invention.
Figure 7B:
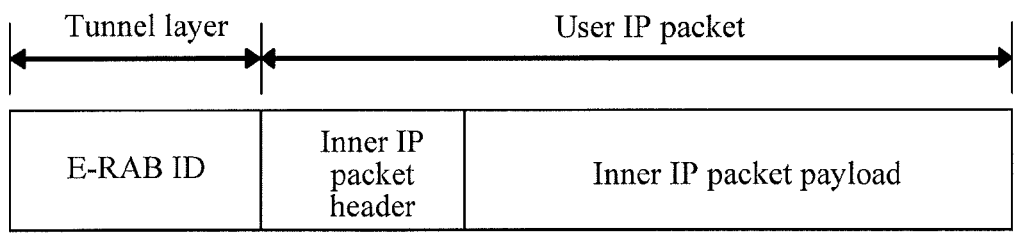

FIG. 7A illustrates an end-to-end tunnel manner between an UE and an S-GW. It can be seen that, a user IP packet (an inner IP packet) is encapsulated in an outer UDP/IP packet. For an IP packet in the uplink direction, a source address of an IP packet header of a user IP packet is an IP address of a UE, a destination address is an IP address of a remote server, a source address of an IP packet header of an outer IP packet is the IP address of the UE, a destination address is an IP address of an eNB or S-GW corresponding to the UE, and a UDP port number of a UDP header of the outer IP packet is a tunnel number of a end-to-end tunnel. FIG. 7B illustrates an end-to-end tunnel manner between an UE and an S-GW. It can be seen that, before a user IP packet, a tunnel layer field is added, which is used to indicate an E-RAB ID of a bearer corresponding to a end-to-end tunnel, and is served as a tunnel number of the end-to-end tunnel.

In addition to adopting the tunnel manners shown in FIG. 7A and FIG. 7B, the end-to-end tunnel between the UE and the S-GW may also be achieved through other manners, for example, achieved by adopting protocols such as IPSec (Internet Protocol Security, Internet protocol security) and IEEE 802.2 LLC (Logical Link Control, logical link control).

Figure 8:
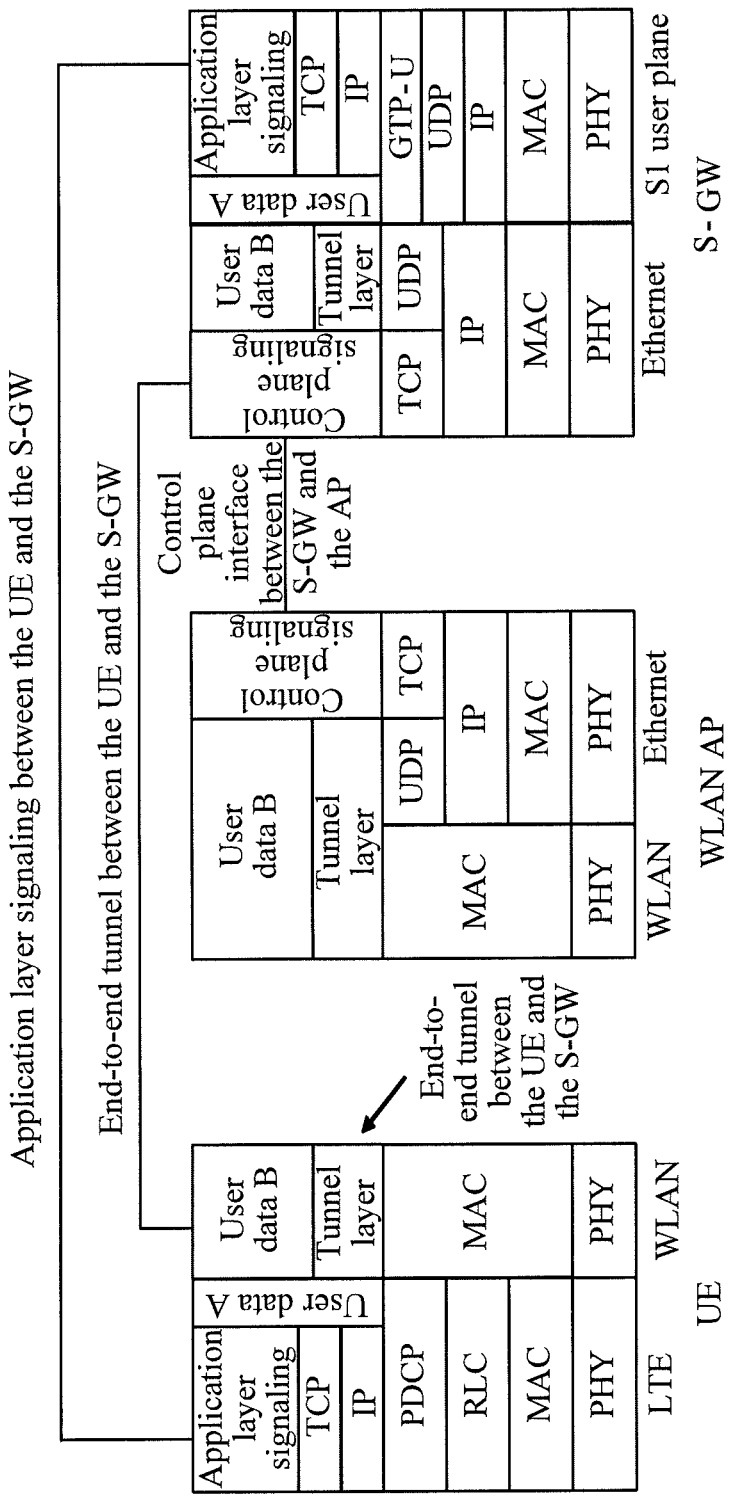
FIG. 8 is a schematic diagram of protocol stacks involved in an embodiment of the present invention.

FIG. 8 is a schematic diagram of protocol stacks, which are related to this embodiment, of a UE, a WLAN AP, and an S-GW. As shown in FIG. 8, one part of user data streams ("user data A" shown in the drawing) are transmitted through an LTE air interface, the other part of the user data streams ("user data B" shown in the drawing) are transmitted through a WLAN air interface, and as stated above, this part of the user data streams are transmitted through an end-to-end tunnel between the UE and the S-GW. A data plane interface between the S-GW and the WLAN AP adopts a UDP over LP manner for transmission, a control plane interface adopts a TCP over IP or SCTP over IP manner for transmission, and all of the data streams ("user data A+B" shown in the drawing) of the user is finally transmitted between the S-GW and the PDN-GW through a GTP-U tunnel of an S1 interface user plane.

Meanwhile, the LTE air interface is further used to transmit application layer offloading control signaling between the UE and the S-GW, and the signaling may be transmitted through a TCP protocol. A first manner in which the UE and the S-GW identify the application layer offloading control signaling is: when there are multiple EPS bearers between the UE and the S-GW, a system allocates a specific bearer channel (for example, one of the multiple EPS bearers) to the application layer offloading control signaling, so that any information transmitted on the specific bearer can be processed by the UE and the S-GW as application layer offloading control signaling.

A second manner in which the UE and the S-GW identify the application layer offloading control signaling is: a UE side address of the application layer offloading control signaling, namely, an IP address obtained by the UE during network attachment, an S-GW side IP address, and a specific IP address (the UE may obtain an IP address of a serving S-GW thereof through a DNS in a domain name manner) configured by a system are transmitted, so that when receiving an IP packet whose destination address is the specific IP address, the S-GW considers that the IP packet bears application layer offloading control signaling from the UE; similarly, when receiving an IP packet whose source address is the specific IP address, the UE considers that the IP packet bears application layer offloading control signaling from the S-GW. The specific IP address is located in the IP address space of an external PDN. To avoid confusing the application layer offloading control signaling and the data packet of the UE, the specific IP address may be a reserved IP address. Taking IPv4 as an example, the specific IP address may be an address between 192.168.0.0 and 192.168.255.255.

A third manner in which the UE and the S-GW identify the application layer offloading control signaling is: a UE side address of the application layer offloading control signaling, namely, an IP address obtained by the UE during network attachment, an S-GW side IP address, and a specific IP address (the UE may obtain an IP address of a serving S-GW thereof through a DNS in a domain name manner) configured by a system are transmitted, and a TCP protocol for transmitting the application layer offloading control signaling adopts a specific TCP port, so that when a destination address received by the S-GW is the specific IP address and a TCP port number is the specific TCP port, it is considered that a TCP over IP packet bears application layer offloading control signaling from the UE; similarly, when a source address received by the UE is the specific IP address and a TCP port number is the specific TCP port, it is considered that the TCP over IP packet bears application layer offloading control signaling from the S-GW. The specific IP address is located in the IP address space of an external PDN. To avoid confusing the application layer offloading control signaling and the data packet of the UE, the specific IP address may be a reserved IP address. Taking IPv4 as an example, the specific IP address may be an address between 192.168.0.0 and 192.168.255.255. The specific TCP port is a TCP port which is not frequently used (for example, 0-1024 are frequently used TCP port numbers).

An establishment process of converged transmission of the LTE and the WLAN in this embodiment is described below. First, if a UE has uplink data to be transmitted and is not attached to a network yet, the UE starts a network attachment process to enter an EMM-REGISTERED state, and at the moment, an EPS bearer is in an active state, and the UE therefore obtains an IP address and establishes at least one EPS bearer. If a user enables a WLAN offloading function, the UE and the S-GW may use one of the at least one EPS bearer to initiate an application layer offloading control signaling process between the UE and the S-GW, so as to establish the converged transmission of the LTE and the WLAN.

Because WLAN APs are generally distributed in a hot spot area and have discontinuous coverage, if the UE enables a WLAN transceiver module all along, unnecessary power consumption is generated. On the other hand, the S-GW can obtain location information of the UE. For example, the S-GW can obtain a cell or a tracking area (Tracking Area, TA) where the UE is. Particularly, when a user data offloading function is located in an eNB, the eNB may further obtain, through wireless measurement on the LTE air interface, more precise location information on whether the UE is located in the center of the cell or on edges of some neighboring cells. Therefore, the S-GW may notify, through application layer offloading control signaling, the UE that an accessible WLAN AP exists in a current location, to enable the WLAN function module to start WLAN offloading. The S-GW may also notify, through application layer offloading control signaling, the UE that no accessible WLAN AP exists in the current location (for example, the UE leaves a WLAN hot spot area, or the WLAN limits access of users due to causes such as severe interference and too heavy load), to disable the WLAN function module to reduce power consumption of the UE.

After detecting an accessible WLAN AP, the UE may obtain a BSSID (Basic Service Set Identity, basic service set identity) uniquely identifying the WLAN AP. Generally, the BSSID of a WLAN AP is a WLAN MAC address of the WLAN AP. The S-GW stores a BSSID list of all WLAN APs connected to the S-GW. In this way, the UE may send, to the S-GW through application layer offloading control signaling between the UE and the S-GW, a WLAN MAC address of the UE and a BSSID of a WLAN AP with which the UE attempts to be associated, and the S-GW matches the BSSID with a BSSID list, stored by the S-GW, of the WLAN APs connected to the S-GW, and if the matching fails, the UE is notified that association with the WLAN AP should not be initiated, and if the matching succeeds, the UE is notified that association with the WLAN AP and a WLAN authentication process may be initiated.

The WLAN authentication process may adopt an authentication manner based on a SIM (Subscriber Identity Module, subscriber identity module) or a USIM (Universal Subscriber Identity Module, universal subscriber identity module). For a detailed process, reference can be made to standards such as specifications RFC4186 and RFC4187 of IETF.

The WLAN authentication process may also adopt an automatic authentication manner based on a WLAN MAC address or a WLAN MAC address and an IP address of the UE. Specifically, the UE informs a WLAN MAC address of the UE or even an IP address of the UE through application layer offloading control signaling between the UE and the S-GW to the S-GW. The S-GW sends the WLAN MAC address of the UE or even the IP address of the S-GW to the WLAN AP that is successfully matched by the BSSID and is associated. Further, the UE further negotiates an encryption algorithm of a WLAN air interface and a key to the encryption algorithm with the S-GW through application layer offloading control signaling between the UE and the S-GW. The S-GW sends the negotiated encryption algorithm of the WLAN air interface and the key to the encryption algorithm to the WLAN AP that is successfully matched by the BSSID and is associated. In this way, the WLAN AP establishes a binding relationship between the WLAN MAC address of the UE and the key to the encryption algorithm, or a binding relationship between the WLAN MAC address and IP address of the UE and the key to the encryption algorithm. In this way, only a UE that satisfies the binding relationship can be considered legal by the WLAN AP and permitted for accessing.

After a UE is associated with the WLAN AP and is authenticated successfully, the UE notifies the S-GW through application layer offloading control signaling between the UE and the S-GW that the UE (a WLAN MAC address is used to identify the UE) already accesses the WLAN AP, or the WLAN AP notifies the S-GW through a control plane interface between the WLAN AP and the S-GW that the UE already accesses the WLAN AP, and the S-GW stores correspondence between the UE and a BSSID of the WLAN AP to which the UE accesses. When the UE is associated with another WLAN AP connected to the S-GW due to movement of the UE, the S-GW updates the correspondence between the UE and a BSSID of the new WLAN AP to which the UE accesses. In this way, by using the correspondence, the S-GW can always send downlink user data offloaded to the WLAN to a WLAN AP to which the UE currently accesses, so as to send the downlink user data to the UE through the WLAN AP.

Meanwhile, through application layer offloading control signaling between the UE and the S-GW, the UE and the S-GW make the following preparation for establishment of converged transmission of the LTE and the WLAN.

(1) The UE informs the IMSI and the WLAN MAC address of the UE through the application layer offloading control signaling between the UE and the S-GW to the S-GW, the S-GW uses the IMSI and the WLAN MAC address of the UE to establish correspondence between the WLAN MAC address of the UE and all bearer channels (that is, GTP-U tunnels) of the UE.

(2) The UE may further negotiate and determine a data offloading manner of the UE through the application layer offloading control signaling between the UE and the S-GW, for example, in both the uplink direction and the downlink direction, determine which IP flows (which are in one-to-one correspondence with E-RAB IDs/GTP-U tunnel identifiers) are transmitted through the WLAN air interface (the rest is transmitted through the LTE air interface). For example, it is assumed that a PDN connection of a UE establishes four EPS bearers, which correspond to four IP flows, respectively. After negotiation, the first and fourth IP flows are transmitted through the WLAN air interface, and the second and third IP flows are transmitted through the LTE air interface.

In this embodiment, a user is allowed to configure a ratio or priority of data traffic transmitted through the LTE air interface and the WLAN air interface. For example, if a tariff policy of an operator stipulates that WLAN access is free, or the tariff of the traffic passing through the WLAN is lower than the tariff of LTE, the user is more willing to preferably select the WLAN for data transmission. For another example, when power of a battery of the user is insufficient, the user is likely to select an air interface that consumes less power to transmit data, so as to extend the battery life of a terminal. A system performs further selection according a certain principle based on the selection of the user. For example, the system may perform selection according to congestion situations of the two air interfaces. When a transmission rate of the WLAN decreases significantly due to strong interference, the system may, based on the selection of the user, offload traffic to the LTE air interface.

(3) The UE may further negotiate, through the application layer offloading control signaling between the UE and the S-GW, the correspondence between the tunnel numbers of the end-to-end tunnels between the UE and the S-GW and the E-RAB IDs of the corresponding bearers, where the end-to-end tunnels are used to transmit a part or all of the W flows through the WLAN air interface. As stated above, by using the correspondence, the S-GW and the UE may determine the correspondence between a part or all of the IP flows that are transmitted through the WLAN air interface and the corresponding bearers.

Meanwhile, the S-GW and the WLAN AP to which the UE accesses negotiate, through a control plane interface between the S-GW and the WLAN AP, a UDP port number of uplink data and/or downlink data of the UE transmitted by the user plane interface between the S-GW and the WLAN AP. The WLAN AP and the S-GW may establish correspondence between the MAC address of the UE and a corresponding UDP port number of the user plane interface between the S-GW and the WLAN AP.

After the above operation is completed, converged transmission of the LTE and the WLAN can be started. As stated above, in the uplink direction, the UE uses the UL-TFT function to divide the uplink data streams of the UE into different uplink IP flows, maps a part or all of uplink IP flows that need be transmitted through the WLAN air interface to a corresponding end-to-end tunnel between the UE and the S-GW, and the uplink IP flows are sent to the WLAN AP through the WLAN air interface. The WLAN AP sends all uplink data packets from the UE of the MAC address to the S-GW through a corresponding UDP port. The S-GW uses a number of the UDP port to find a bearer channel (for example, a GTP-U tunnel) of the corresponding UE according to the correspondence between the UDP port number of the user plane interface between the S-GW and the WLAN AP and the MAC address of the UE, and uses the correspondence between end-to-end tunnel numbers between the UE and the S-GW and the corresponding GTP-U tunnels of a part or all of the IP flows to forward a part or all of the IP flows to corresponding uplink GTP-U tunnels, respectively. Meanwhile, the UE sends the rest of the uplink IP flows to the S-GW through a corresponding uplink LTE radio bearer according to existing standards of the LTE, and the S-GW then forwards them to corresponding uplink GTP-U tunnels, respectively. In this way, converged transmission of the uplink user data at the LTE and WLAN air interfaces is realized.

In the downlink direction, the PDN-GW uses the DL-TFT function to divide the downlink data streams of the UE into different downlink IP flows. The downlink IP flows arrive at the S-GW through corresponding downlink GTP-U tunnels. The S-GW maps a part or all of the downlink IP flows to corresponding end-to-end tunnels between the UE and the S-GW, respectively, and the downlink IP flows are sent to the WLAN AP through a corresponding UDP port. The WLAN AP uses the UDP port number to send all downlink data packets of the UE from the UDP port to the UE of the MAC address through the WLAN air interface according to the correspondence between the UDP port number of the user plane interface between the S-GW and the WLAN AP and the MAC address of the UE. The UE uses the correspondence between the end-to-end tunnel number between the UE and the S-GW and a part or all of the IP flows to distinguish IP flows of different PDN connections of the UE. Meanwhile, the S-GW sends the rest of the downlink IP flows to the UE through a corresponding downlink LTE radio bearer according to existing standards of the LTE. In this way, converged transmission of the downlink user data at the LTE and WLAN air interfaces is realized.

Further, when the UE is to leave a current serving S-GW due to movement of the UE, the S-GW receives an S-GW handover request of the UE. Before the S-GW decides to start S-GW handover, the S-GW first performs reconfiguration on offloading, and reconfigures user data streams originally offloaded by the WLAN to be transmitted by the LTE, and notifies, through the application layer offloading control signaling between the UE and the S-GW, the UE that the UE can be dissociated from the WLAN AP to which the UE currently accesses, or notifies, through the control plane interface between the S-GW and the WLAN AP, the UE that the WLAN AP to which the UE currently accesses can be dissociated from the UE. After the dissociation succeeds, the S-GW starts an S-GW handover process. After the S-GW handover completes and the UE is handed over to a new S-GW, if an accessible WLAN AP is currently available, the UE follows the aforementioned process again to access a WLAN AP connected to a current serving S-GW, so as to reestablish converged transmission of the LTE and the WLAN.

Embodiment 2

An S-GW has a Built-in Packet Filter/a UE has a Built-in Packet Filter Outside an LTE Communication Module In this embodiment, a PDN connection of a UE corresponds to only one EPS bearer, that is, there is only one GTP-U tunnel between a PDN-GW and an S-GW. In this embodiment, a DL-TFT function of the PDN-GW is not used to divide downlink data streams of the UE. However, a packet filter is built in an S-GW, to divide downlink user data of each PDN connection of the UE into different downlink IP flows (IP Flow). The S-GW then sends a part or all of the downlink IP flows to a WLAN AP according to a data offloading manner negotiated with the UE, so as to transmit them to the UE through a WLAN air interface, and meanwhile the rest of the downlink IP flows are transmitted to the UE through an LTE air interface, thereby realizing offloading and converged transmission of the downlink user data at the LTE and WLAN air interfaces.

In an uplink direction, the UE uses a built-in packet filter outside an LTE communication module (generally an independent ASIC chip) to divide an uplink data stream from each PDN connection of an application layer into different uplink IP flows. The UE then sends a part or all of the uplink IP flows to a WLAN AP through the WLAN air interface according to a data offloading manner negotiated with the S-GW, and the WLAN AP then transmits them to the S-GW. Meanwhile, the rest of the uplink IP flows are transmitted to the S-GW through the LTE air interface. Finally, the S-GW forwards all the uplink IP flows of the PDN connection from the WLAN air interface and the LTE air interface to an uplink GTP-U tunnel corresponding to the PDN connection, thereby realizing offloading and converged transmission of the uplink user data at the LTE and WLAN air interfaces.

A WLAN AP uses a MAC address of a UE to uniquely identify the UE, and a user plane interface between the S-GW and the WLAN AP may use UDP port numbers to distinguish different UEs. Therefore, the WLAN AP and the S-GW may establish correspondence between the MAC address of the UE and a corresponding UDP port number of the user plane interface between the S-GW and the WLAN AP. In this way, any uplink data packet from the UE of the MAC address is received by the WLAN AP and sent through a corresponding UDP port to the S-GW. According to the correspondence between the UDP port number of the user plane interface between the S-GW and the WLAN AP and the MAC address of the UE, the S-GW uses the UDP port number to make the uplink data packet correspond to a bearer channel (that is, a GTP-U tunnel) of the corresponding UE.

Meanwhile, the S-GW sends a downlink data packet, which needs to be transmitted through the WLAN air interface, of the UE to the WLAN AP through the UDP port according to the correspondence between the UDP port number of the user plane interface between the S-GW and the WLAN AP and the MAC address of the UE. The WLAN AP receives a downlink data packet that is transmitted through a certain UDP port and is from the S-GW, and searches for the MAC address of the corresponding UE according to the UDP port number, so as to send the downlink data packet to the UE of the corresponding MAC address through the WLAN air interface.

As stated above, the S-GW can only obtain the UDP port number or information of a WLAN MAC address of the UE from the interface of the S-GW and the WLAN AP. Corresponding to the bearer channels of the corresponding UE, the S-GW needs to establish correspondence between the WLAN MAC address of the UE and all bearer channels of the UE. Although a PDN connection of a UE corresponds to only one EPS bearer, that is, there is only one GTP-U tunnel between the PDN-GW and the S-GW, because the UE may be connected to multiple PDNs at the same time, a UE in the S-GW may correspond to multiple GTP-U tunnels.

Therefore, the UE informs the S-GW of correspondence between the IMSI of the UE and the WLAN MAC address of the UE through application layer offloading control signaling between the UE and the S-GW, where the IMSI is a unique identifier of a UE in a mobile cellular network. The S-GW stores correspondence between an IMSI of each UE and all bearer channels of the UE. In this way, by using the IMSI and the WLAN MAC address of the UE, the S-GW may establish correspondence between the WLAN MAC address of the UE and all the bearer channels of the UE.

As stated above, although a PDN connection of a UE establishes only one EPS bearer, that is, there is only one GTP-U tunnel between the PDN-GW and the S-GW, because the UE may be connected to multiple PDNs at the same time, a UE in the S-GW may correspond to multiple GTP-U tunnels. However, on a UE side, different PDN connections of a same UE also need to be distinguished, so as to provide uplink data of a corresponding PDN connection to a corresponding application layer. The WLAN AP cannot distinguish IP flows of different PDN connections of the same UE that are transmitted through the WLAN air interface, so that both the S-GW and the UE need to be provided with a method for distinguishing the IP flows of the different PDN connections of the same UE that are transmitted through the WLAN air interface.

Therefore, in an embodiment, IP addresses is used to distinguish IP flows corresponding to different PDN connections of the same UE. Specifically, the IP addresses in different PDNs are independent of each other. Therefore, when a UE is connected to multiple PDNs simultaneously, it is possible that IP addresses allocated to the same UE for use in different PDN connections are the same. Therefore, in order to use IP addresses to distinguish between different PDN connections of the same UE, the IP addresses allocated for use in different PDN connections should not be the same. In a practical system, because the IP address space is enormous, the probability that two or more PDNs allocate the same IP address to the same UE is little; if the IP address allocated for a second PDN connection is the same as the IP address allocated for a first PDN connection, the UE may require a network to allocate another IP address for the second PDN connection to avoid such special circumstances.

In this way, data transmission may be first performed through the LTE air interface. The UE resolves a destination address of a user IP packet on each downlink EPS bearer of the UE (that is, an IP address of a corresponding PDN connection of the UE), so as to establish correspondence between IP addresses of all PDN connections of the UE and corresponding application layers. The S-GW resolves a source address of a user IP packet on each uplink EPS bearer of the UE (that is, an IP address of a corresponding PDN connection of the UE), so as to establish correspondence between IP addresses of all PDN connections of the UE and corresponding GTP-U tunnels. Once the S-GW establishes the correspondence and the UE establishes the correspondence, application layer offloading control signaling between the UE and the S-GW can be used to transmit a part or all of uplink and/or downlink IP flows through the WLAN air interface, so as to establish converged transmission of the LTE and the WLAN.

Figure 9:
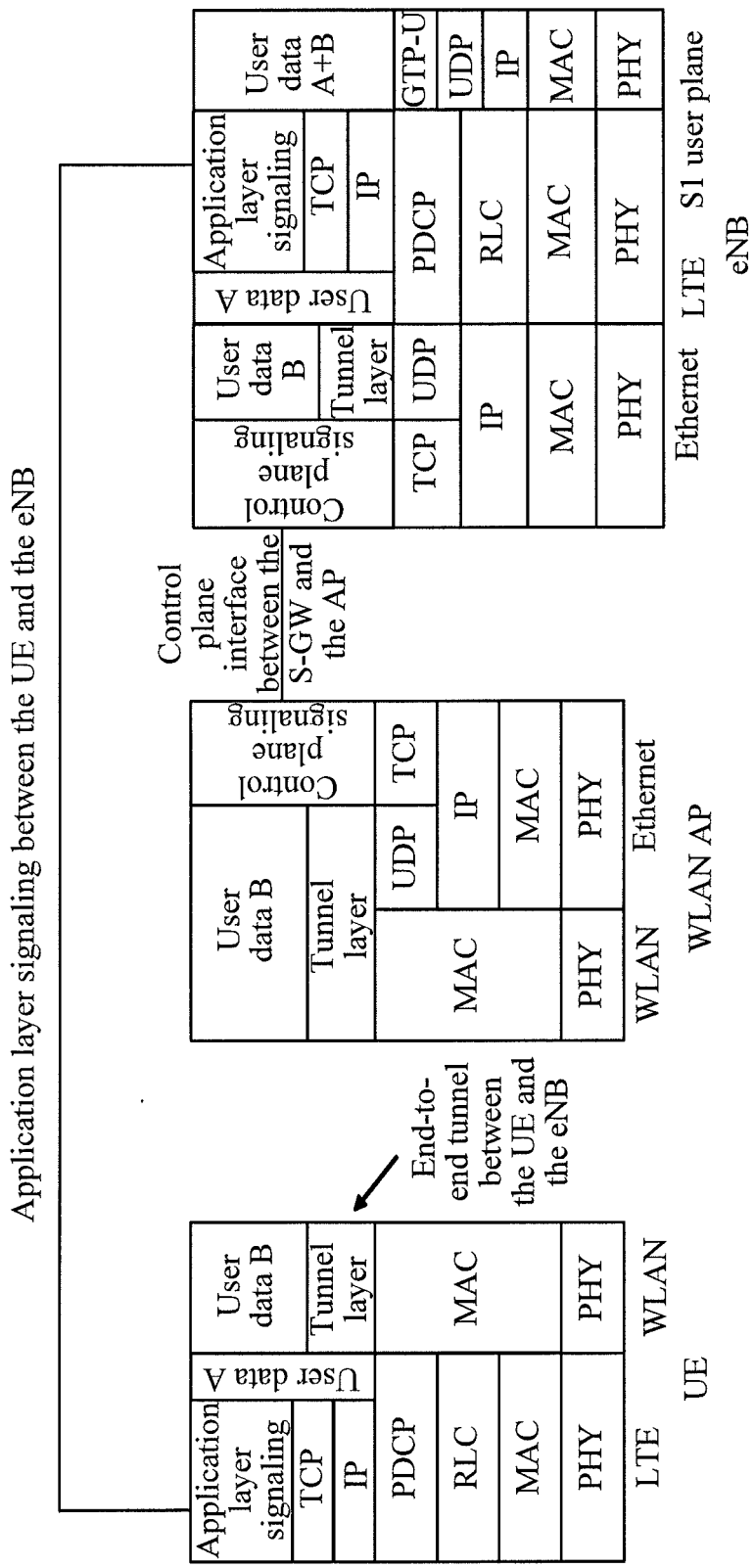
FIG. 9 is a schematic diagram of protocol stacks involved in another embodiment of the present invention.

FIG. 9 is a schematic diagram of protocol stacks, which are related to in this embodiment, of a UE, a WLAN AP, and an S-GW. As shown in FIG. 9, one part of user data streams ("user data A" shown in the drawing) are transmitted through an LTE air interface, and the other part of the user data streams ("user data B" shown in the drawing) are transmitted through a WLAN air interface. A data plane interface between the S-GW and the WLAN AP adopts a UDP over IP manner for transmission, a control plane interface adopts a TCP over IP or SCTP over IP manner for transmission, and all of the data ("user data A+B" shown in the drawing) of the user is finally transmitted between the S-GW and the PDN-GW through a GTP-U tunnel of an S1 interface user plane.

Meanwhile, the LTE air interface is further used to transmit application layer offloading control signaling between the UE and the S-GW, and the signaling may be transmitted through a TCP protocol. A first manner in which the UE and the S-GW identify the application layer offloading control signaling is: a UE side address of the application layer offloading control signaling, namely, an IP address obtained by the UE during network attachment, an S-GW side IP address, and a specific IP address (the UE may obtain an IP address of a serving S-GW thereof through a DNS in a domain name manner) configured by a system are transmitted, so that when receiving an IP packet whose destination address is the specific IP address, the S-GW considers that the IP packet bears application layer offloading control signaling from the UE; similarly, when receiving an IP packet whose source address is the specific IP address, the UE considers that the IP packets bears application layer offloading control signaling from the S-GW. The specific IP address is located in the IP address space of an external PDN. To avoid confusing the application layer offloading control signaling and the data packet of the UE, the specific IP address may be a reserved IP address. Taking IPv4 as an example, the specific IP address may be an address between 192.168.0.0 and 192.168.255.255.

A second manner in which the UE and the S-GW identify the application layer offloading control signaling is: a UE side address of the application layer offloading control signaling, namely, an IP address obtained by the UE during network attachment, an S-GW side IP address, and a specific IP address (the UE may obtain an IP address of a serving S-GW thereof through a DNS in a domain name manner) configured by a system are transmitted, and a TCP protocol that transmits the application layer offloading control signaling adopts a specific TCP port, so that when a destination address received by the S-GW is the specific IP address and a TCP port number is the specific TCP port, it is considered that the TCP over IP packet bears application layer offloading control signaling from the UE; similarly, when a source address received by the UE is the specific IP address and a TCP port number is the specific TCP port, it is considered that the TCP over IP packet bears application layer offloading control signaling from the S-GW. The specific IP address is located in the IP address space of the external PDN. To avoid confusing the application layer offloading control signaling and the data packet of the UE, the specific IP address may be a reserved IP address. Taking IPv4 as an example, the specific IP address may be an address between 192.168.0.0 and 192.168.255.255. The specific TCP port is a TCP port which is not frequently used (for example, 0-1024 are frequently used TCP port numbers).

An establishment process of converged transmission of the LTE and the WLAN is described below. First, if a UE has transmit uplink data to be transmitted and is not attached to a network yet, the UE starts a network attachment process to enter an EMM-REGISTERED state, and at the moment, an EPS bearer is in an active state, and the UE therefore obtains an IP address of a corresponding PDN connection and establishes an EPS bearer. If a user enables a WLAN offloading function, the UE and the S-GW may use the EPS bearer to initiate an application layer offloading control signaling process between the UE and the S-GW, so as to establish the converged transmission of the LTE and the WLAN.

Because WLAN APs are generally distributed in a hot spot area and have discontinuous coverage, if the UE enables a WLAN transceiver module all along, unnecessary power consumption is generated. On the other hand, the S-GW can obtain location information of the UE. For example, the S-GW can obtain a cell or a tracking area (Tracking Area, TA) where the UE is. Particularly, when a user data offloading function is located in an eNB, the eNB may further obtain, through wireless measurement on the LTE air interface, more precise location information on whether the UE is located in the center of the cell or on edges of some neighboring cells. Therefore, the S-GW may notify, through application layer offloading control signaling, the UE that an accessible WLAN AP exists in a current location, to enable the WLAN function module to start WLAN offloading. The S-GW may also notify, through application layer offloading control signaling, the UE that no accessible WLAN AP exists in the current location (for example, the UE leaves a WLAN hot spot area, or the WLAN limits access of users due to causes such as severe interference and too heavy load), to disable the WLAN function module to reduce power consumption of the UE.

After detecting an accessible WLAN AP, the UE may obtain a BSSID uniquely identifying the WLAN AP. Generally, the BSSID of a WLAN AP is a WLAN MAC address of the WLAN AP. The S-GW stores a BSSID list of all WLAN APs connected to the S-GW. In this way, the UE may send, to the S-GW through application layer offloading control signaling between the UE and the S-GW, a WLAN MAC address of the UE and a BSSID of a WLAN AP with which the UE attempts to be associated, and the S-GW matches the BSSID with a BSSID list, stored by the S-GW, of the WLAN APs connected to the S-GW, and if the matching fails, the UE is notified that association with the WLAN AP should not be initiated, and if the matching succeeds, the UE is notified that association with the WLAN AP and a WLAN authentication process may be initiated.

The WLAN authentication process may adopt an authentication manner based on a SIM or a USIM. For a detailed process, reference can be made to standards such as specifications RFC4186 and RFC4187 of IETF.

The WLAN authentication process may also adopt an automatic authentication manner based on a WLAN MAC address or a WLAN MAC address and an IP address of the UE. Specifically, the UE informs a WLAN MAC address of the UE or even an IP address of the UE through application layer offloading control signaling between the UE and the S-GW to the S-GW. The S-GW sends the WLAN MAC address of the UE or even the IP address of the S-GW to the WLAN AP that is successfully matched by the BSSID and is associated. Further, the UE further negotiates an encryption algorithm of a WLAN air interface and a key to the encryption algorithm with the S-GW through application layer offloading control signaling between the UE and the S-GW. The S-GW sends the negotiated encryption algorithm of the WLAN air interface and the key to the encryption algorithm to the WLAN AP that is successfully matched by the BSSID and is associated. In this way, the WLAN AP establishes a binding relationship between the WLAN MAC address of the UE and the key to the encryption algorithm, or a binding relationship between the WLAN MAC address and IP address of the UE and the key to the encryption algorithm. In this way, only a UE that satisfies the binding relationship can be considered legal by the WLAN AP and permitted for accessing.

After a UE is associated with the WLAN AP and is authenticated successfully, the UE notifies the S-GW through application layer offloading control signaling between the UE and the S-GW that the UE (a WLAN MAC address is used to identify the UE) already accesses the WLAN AP, or the WLAN AP notifies the S-GW through a control plane interface between the WLAN AP and the S-GW that the UE already accesses the WLAN AP, and the S-GW stores correspondence between the UE and a BSSID of the WLAN AP to which the UE accesses. When the UE is associated with another WLAN AP connected to the S-GW due to movement of the UE, the S-GW updates the correspondence between the UE and a BSSID of the new WLAN AP to which the UE accesses. In this way, by using the correspondence, the S-GW can always send downlink user data offloaded to the WLAN to a WLAN AP to which the UE currently accesses, so as to send the downlink user data to the UE through the WLAN AP.

Meanwhile, through application layer offloading control signaling between the UE and the S-GW, the UE and the S-GW make the following preparation for establishment of converged transmission of the LTE and the WLAN.

(1) The UE informs the IMSI and the WLAN MAC address of the UE through the application layer offloading control signaling between the UE and the S-GW to the S-GW, the S-GW uses the IMSI and the WLAN MAC address of the UE to establish correspondence between the WLAN MAC address of the UE and all bearer channels (for example, GTP-U tunnels) of the UE.

(2) The UE further negotiates and determines a data offloading manner of the UE through the application layer offloading control signaling between the UE and the S-GW, for example, how to divide uplink and downlink data streams of a user, that is, the setting manners of an uplink UE side packet filter and a downlink S-GW side packet filter. Further, the data offloading manner may further include a ratio or priority of data traffic transmitted through the LTE air interface and the WLAN air interface. For another example, when power of a battery of the user is insufficient, the user is more likely to select the air interface that consumes less power to transmit data, so as to extend the battery life of a terminal. For example, if a tariff policy of an operator stipulates that WLAN access is free, or the tariff of the traffic passing through the WLAN is lower than the tariff of LTE, the user is more willing to preferably select the WLAN for data transmission. A system generally performs optimized selection according to radio resource situations of the LTE and WLAN air interfaces (for example, interference and congestion situations). For example, when a transmission rate of the WLAN decreases significantly due to strong interference, the system is likely to offload the traffic to the LTE air interface.

Meanwhile, the LTE air interface is used to transmit uplink and downlink data of the UE. The UE resolves a destination address of a user IP packet on each downlink EPS bearer of the UE (that is, an IP address of a corresponding PDN connection of the UE), so as to establish correspondence between IP addresses of all PDN connections of the UE and corresponding application layers. The S-GW resolves a source address of a user IP packet on each uplink EPS bearer of the UE (that is, an IP address of a corresponding PDN connection of the UE), so as to establish correspondence between IP addresses of all PDN connections of the UE and corresponding GTP-U tunnels.

Meanwhile, the S-GW and the WLAN AP to which the UE accesses negotiate, through a control plane interface between the S-GW and the WLAN AP, a UDP port number of uplink data and/or downlink data of the UE transmitted on the user plane interface between the S-GW and the WLAN AP. The WLAN AP and the S-GW may establish correspondence between the MAC address of the UE and a corresponding UDP port number of the user plane interface between the S-GW and the WLAN AP.

After the above operation is completed, converged transmission of the LTE and the WLAN can be started. As stated above, in the uplink direction, the UE uses a built-in packet filter outside an LTE communication module (generally an independent ASIC chip) to divide an uplink data stream from each PDN connection of an application layer into different uplink IP flows. The UE then sends a part or all of the uplink IP flows to a WLAN AP through the WLAN air interface according to a data offloading manner negotiated with the S-GW, and the WLAN AP transmits all uplink data packets from the UE of the MAC address to the S-GW through a corresponding UDP port. The S-GW uses a number of the UDP port to find a bearer channel (for example, a GTP-U tunnel) of the corresponding UE according to the correspondence between the UDP port number of the user plane interface between the S-GW and the WLAN AP and the MAC address of the UE, divides all uplink data packets of the UE that are transmitted through the WLAN into at least one data stream according different source IP addresses (corresponding to different PDN connections), and uses the established correspondence between the IP addresses of all the PDN connections of the UE and the corresponding GTP-U tunnels to forward the at least one data stream to a corresponding GTP-U tunnel. Meanwhile, the UE sends the rest of the uplink IP flows to the S-GW through a corresponding uplink LTE radio bearer according to existing standards of the LTE, and the S-GW forwards them to corresponding uplink GTP-U tunnels, respectively. In this way, converged transmission of the uplink user data at the LTE and WLAN air interfaces is realized.

In the downlink direction, the S-GW divides a downlink data stream of each PDN connection of the UE into different downlink IP flows through a built-in packet filter. The S-GW then sends a part or all of the downlink IP flows to a WLAN AP through a corresponding UDP port according to a data offloading manner negotiated with the UE. The WLAN AP uses the UDP port number to send all downlink data packets of the UE from the UDP port to the UE of the MAC address through the WLAN air interface according to the correspondence between the UDP port number of the user plane interface between the S-GW and the WLAN AP and the MAC address of the UE. The UE divides all uplink data packets from the WLAN air interface into at least one data stream according different destination IP addresses (corresponding to different PDN connections), and uses the established correspondence between the IP addresses of all the PDN connections of the UE and the corresponding application layers to forward the at least one data stream to a corresponding application layer. Meanwhile, the S-GW sends the rest of the downlink IP flows to the UE through a corresponding downlink LTE radio bearer according to existing standards of the LTE. In this way, converged transmission of the downlink user data at the LTE and WLAN air interfaces is realized.

Further, when the UE is to leave a current serving S-GW due to movement of the UE, the S-GW receives an S-GW handover request of the UE. Before the S-GW decides to start S-GW handover, the S-GW first performs reconfiguration on offloading, and reconfigures user data streams originally offloaded by the WLAN to be transmitted by the LTE, and notifies, through the application layer offloading control signaling between the UE and the S-GW, the UE that the UE can be dissociated from the WLAN AP to which the UE currently accesses, or notifies, through the control plane interface between the S-GW and the WLAN AP, the UE that the WLAN AP to which the UE currently accesses can be dissociated from the UE. After the dissociation succeeds, the S-GW starts an S-GW handover process. After the S-GW handover completes and the UE is handed over to a new S-GW, if an accessible WLAN AP is currently available, the UE follows the aforementioned process again to access a WLAN AP connected to a current serving S-GW, so as to reestablish converged transmission of the LTE and the WLAN.

Compared with Embodiment 1, in Embodiment 2, IP flows may be dynamically scheduled between the LTE/WLAN, thereby making the control flexible. Meanwhile, the problems that the UE needs to obtain an access layer bearer identifier, such as an E-RAB ID and an LTE communication module is required to output IP flows that are output by a UL-TFT and are offloaded through the WLAN are avoided, thereby making implementation easy.

Figure 10:
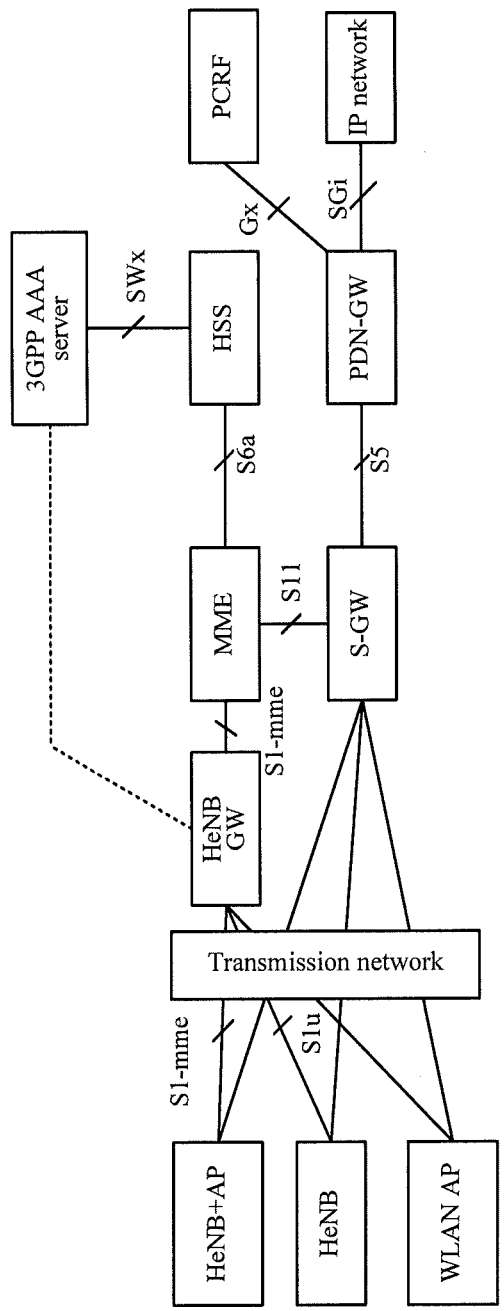
FIG. 10 is a schematic diagram of a tightly coupled network architecture of an LTE HeNB and a WLAN according to an embodiment of the present invention.

Some special scenarios in which the embodiment of the present invention is applied are described below with reference to a specific example. FIG. 10 is a schematic diagram of a tightly coupled network architecture of an LTE HeNB and a WLAN according to an embodiment of the present invention. An HeNB (Home eNB, home eNB) and an HeNB GW (Home eNB Gateway, home eNB gateway) shown in FIG. 10 are network elements of an LTE home evolved Node B access network defined by a 3GPP protocol system. On a user plane, the HeNB is connected to an S-GW through an S1u interface. On a control plane, the HeNB is connected to the HeNB GW through an S1-mme interface. In existing 3GPP protocols, the HeNB GW is mainly responsible for control plane convergence, so that the HeNB GW is also connected to the S-GW through an S1-mme interface. A transport layer protocol of the S1-mme interface of the control plane is an SCTP (Stream Control Transmission Protocol, stream control transmission protocol). An S1u interface of a user plane adopts a GTP-U (GPRS Tunneling Protocol—User plane, GPRS tunneling protocol—user plane) transport layer protocol borne on a UDP, that is, in a GTP-U tunnel.

Figure 12:
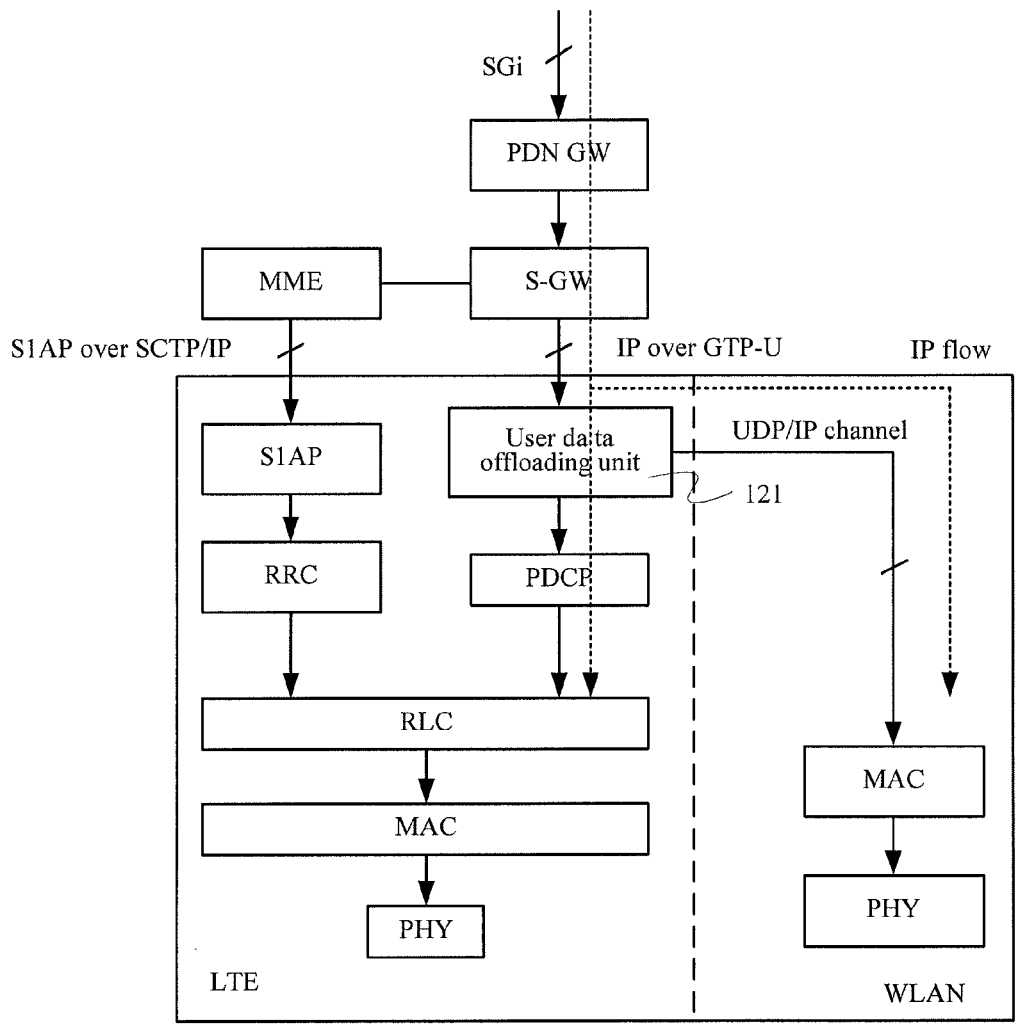
FIG. 12 is a flow chart of a data transmission method according to an embodiment of the present invention.

As shown in FIG. 10, when sharing a station address, a WLAN AP and the HeNB are generally integrated in a same physical device. The WLAN AP and the HeNB may also be connected to an HeNB GW separately. A transmission network shown in FIG. 12 provides the HeNB and the WLAN AP with an IP transmission channel for accessing the HeNB GW. In addition to relevant functions defined by an existing 3GPP protocol system, the HeNB GW further includes the AC control and management functions in the existing WLAN network, which include WLAN related management and control functions such as performing security authentication on the WLAN AP connected to the HeNB GW, network management, and coordination and management of interference between WLAN APs. Therefore, the HeNB GW is further connected to an AAA server, to perform access authentication on a WLAN user. The AAA server is preferably a 3GPP AAA Server.

Figure 11:
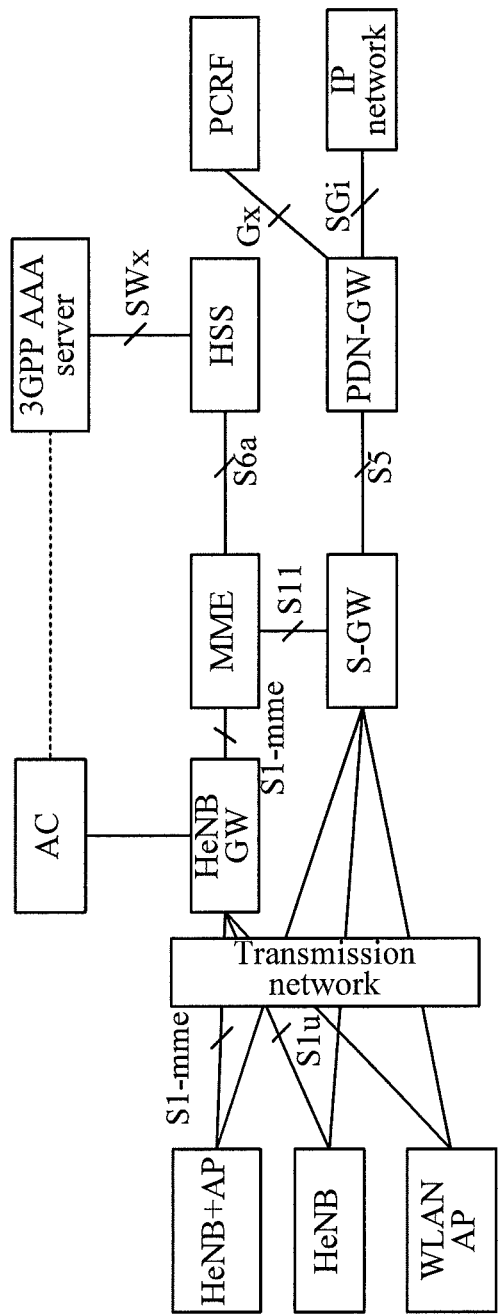
FIG. 11 is a schematic diagram of another tightly coupled network architecture of an LTE HeNB and a WLAN according to an embodiment of the present invention.

FIG. 11 is a schematic diagram of another tightly coupled network architecture of an LTE HeNB and a WLAN according to an embodiment of the present invention. Different from the architecture shown in FIG. 10, in the architecture in FIG. 11, the AC control and management functions in the existing WLAN network, which include WLAN related management and control functions such as performing security authentication on the WLAN AP connected to the HeNB GW, network management, and coordination and management of interference between WLAN APs, are not integrated in the HeNB GW, and act as an independent device AC (WLAN AP Controller, WLAN AP controller) to be connected to the HeNB GW and the AAA server. An IP interface may be adopted between the AC and the HeNB GW. The HeNB GW performs a function of forwarding an IP packet bearing WLAN related management and control between the AC and the WLAN AP.

In the architecture shown in FIG. 10, a logical interface exists between the HeNB GW and the WLAN AP. The interface is divided into a control plane and a user plane. The control plane is used to transmit WLAN related management and control information and mobility management related information. The user plane is used to transmit a user data stream that is offloaded to the WLAN AP and transmitted through the WLAN. The user plane adopts a UDP over IP manner for transmission. The control plane adopts a TCP over IP or SCTP over IP manner for transmission. In the architecture shown in FIG. 11, a logical interface also exists between the AC and the WLAN AP, and may adopt the TCP over IP or SCTP over IP manner for transmission, so as to transmit WLAN related management and control information. The control plane of the interface between the HeNB GW and the WLAN AP mainly transmits mobility management related information.

A user data offloading function for realizing converged transmission of the LTE and the WLAN may be realized in an HeNB (only when the HeNB and the WLAN AP are integrated), and may also be realized in an S-GW FIG. 12 is a schematic diagram of user data transmission when a user data offloading function is in the HeNB (an offloading point device is the HeNB). Taking a downlink direction as an example, user data arrives at a PDN-GW through a Gi interface, arrives at an S-GW through a GTP-U tunnel of an S5 interface, and then arrives at an HeNB (the HeNB and a WLAN AP are integrated) through a GTP-U tunnel of an S1u interface. The user data arriving at the HeNB is first divided by a user data offloading unit 121 into two parts, so as to be transmitted through UMTS and WLAN air interfaces, respectively.

Figure 13:
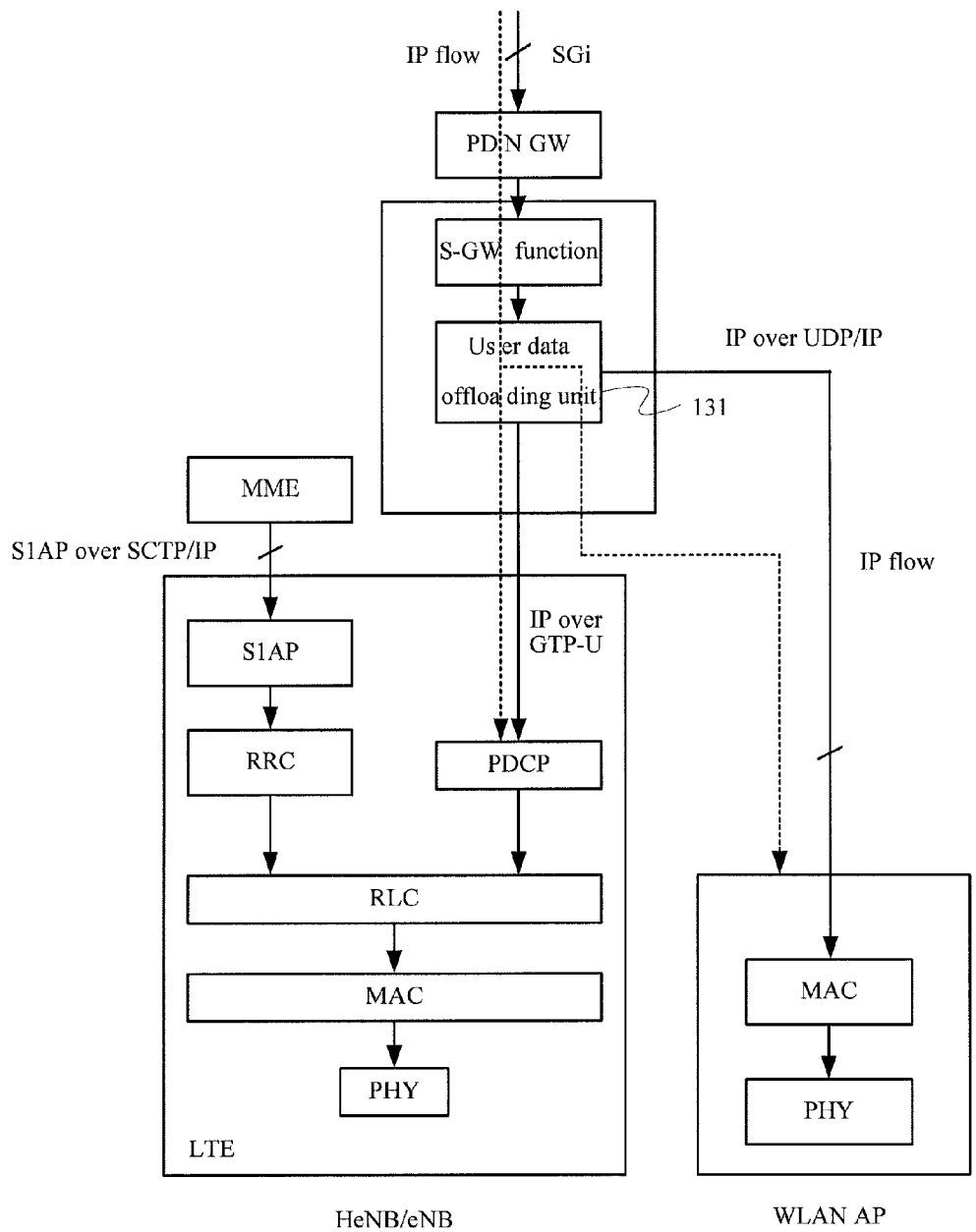
FIG. 13 is a flow chart of a data transmission method according to an embodiment of the present invention.

FIG. 13 is a schematic diagram of user data transmission when the user data offloading function is in an S-GW (the offloading point device is the S-GW). The manner is applicable to a situation where the HeNB and the WLAN AP are integrated, a situation where the HeNB and the WLAN AP perform independent coverage separately, and a situation where a UE performs converged transmission with a macro evolved Node B eNB and a WLAN AP at the same time (the WLAN AP performs networking according to an architecture of a home evolved Node B, and the eNB and the WLAN AP are connected to a same S-GW). Taking a downlink direction as an example, after being processed by an S-GW function in an S-GW, user data is divided by a user data offloading unit 131 into two parts. User data transmitted through the LTE is sent to an HeNB or an eNB through a transmission channel of a user plane of S1u, that is, GTP-U/UDP/IP, and user data transmitted through the WLAN is sent to a WLAN AP through UDP/IP, which are transmitted through two air interfaces, respectively. A process of an uplink direction is opposite to the process of the downlink direction, and is not repeated herein.

Figure 14:
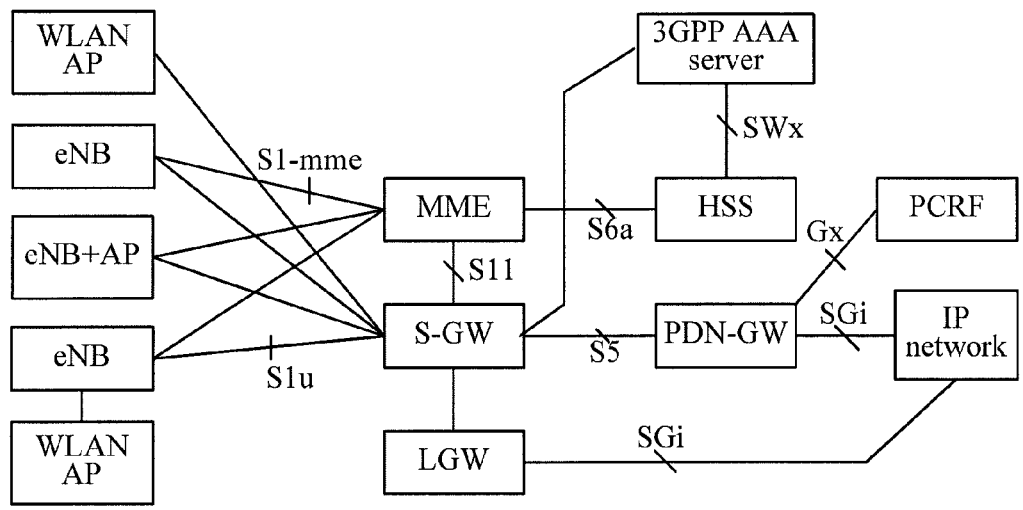
FIG. 14 is a schematic diagram of an exemplary architecture of a WLAN-Only scenario according to an embodiment of the present invention.
Figure 15:
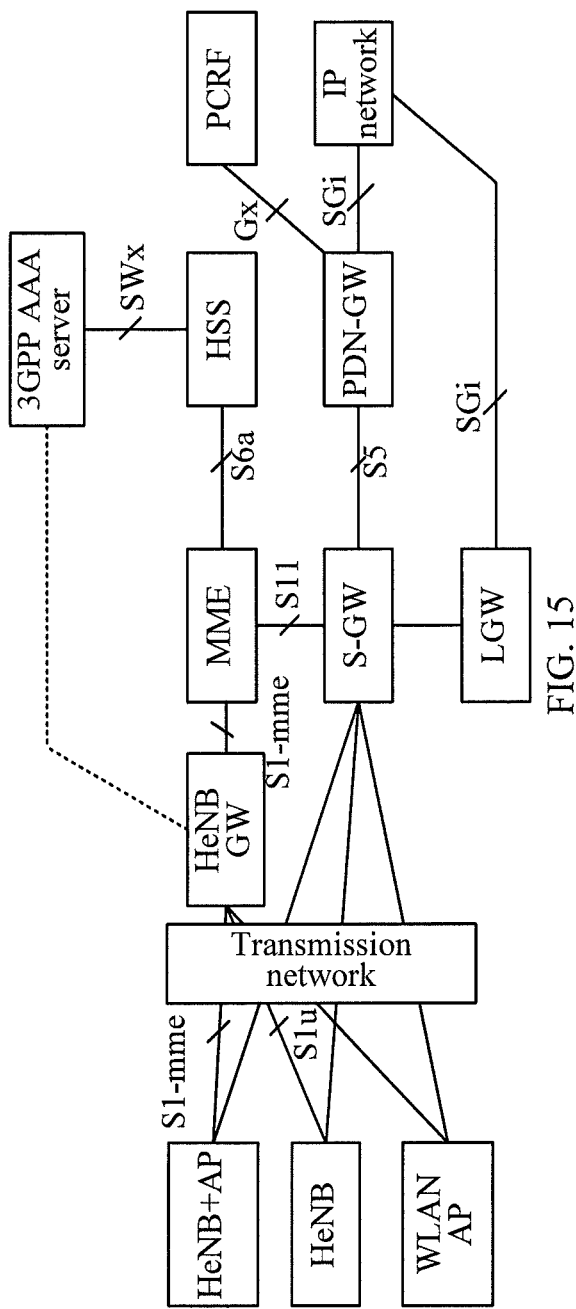
FIG. 15 is a schematic diagram of an exemplary architecture of a WLAN-Only scenario according to another embodiment of the present invention.

A solution to make a WLAN-only terminal (for example, a WLAN-only tablet computer or notebook computer, and a terminal that has a cellular system accessing function and a WLAN accessing function but cannot use cellular system access because of being not a subscriber to a current network operator) access the converged network of the LTE and the WLAN is provided below. FIG. 14 and FIG. 15 are schematic diagrams of exemplary architectures of WLAN-Only scenarios according to an embodiment of the present invention. FIG. 14 corresponds to the architecture in FIG. 1, and FIG. 15 corresponds to the architecture in FIG. 10. Functions of an AC are combined in an S-GW or an HeNB GW. However, a WLAN-Only application of the embodiment of the present invention may also be used in an architecture where an AC acts as a separate network element (corresponding to the architectures in FIG. 2 and FIG. 11).

First, a WLAN-only terminal has no cellular network accessing ability, so different from a dual-mode terminal having both a cellular system accessing function and a WLAN accessing function, for the WLAN-only terminal, the problem of handover between a cell and a WLAN does not need to be considered, and meanwhile, the WLAN is generally applied in a hot spot area, that is to say, the WLAN does not have continuous coverage, and cannot realize mobility across hot spots of different areas. Therefore, for a WLAN-only terminal, realizing handover between WLAN APs in a certain hot spot area can meet demands. In the network architectures shown in FIG. 14 to FIG. 15, a data convergence point (such as an eNB, an HeNB, and an S-GW) may be connected to WLAN APs of multiple hot spot areas (the hot spot areas may have continuous coverage or have no continuous coverage). WLANs between different data convergence points do not have continuous WLAN coverage, and are independent WLAN serving areas.

Based on the above analysis, WLAN mobility between data convergence points (such as an eNB, an HeNB, and an S-GW) is not required, so for a WLAN-Only terminal, data thereof does not need to pass through an EPC core network, and may be offloaded to an external IP network directly from a data convergence point. Therefore, as shown in FIG. 14 to FIG. 15, a data convergence point (such as an eNB, an HeNB, and an S-GW) is connected to an LGW (Local Gateway, local gateway). An IP interface exists between the LGW and the data convergence point. The control plane may perform transmission through TCP over IP or SCTP over IP. User plane data may be transmitted through UDP over IP. The LGW may be integrated with the data convergence point, and the data convergence point is directly connected to an external IP network.

The LGW may also be a PDN GW with simplified functions and small capacity. An interface between the LGW and the S-GW may adopt a GTP (GPRS tunnel protocol) transmission protocol of a cellular system packet domain, that is, the control plane adopts GTPv2-C, the user plane adopts a GTP-U manner, and GTPv2-C and GTP-U are both borne on the UDP/IP. Alternatively, an interface may be configured between the data convergence point and the PDN GW, so that the data convergence point may directly transmit data of the WLAN-Only terminal to a PDN GW through the interface.

Unlike a dual-mode terminal whose authentication is generally based on a SIM/USIM, a WLAN-only terminal generally has no cellular device, and therefore, user authentication is still based on a user name and password, namely, a user is authenticated by automatically or manually inputting the user name and password allocated by a system.

In this way, when WLAN APs under a same data convergence point have continuous coverage, the WLAN-Only terminal can be handed over between APs based on an existing WLAN protocol. Taking FIG. 14 as an example, after finding an accessible WLAN AP, a WLAN-Only terminal is associated with the AP, and a user name and a password allocated by a system are used to perform WLAN authentication. Authentication request information is sent to an S-GW through a control plane interface between the WLAN AP and the S-GW. The S-GW queries an AAA server to verify validity of a user. After the authentication succeeds, the system uses a DHCP function in an LGW to allocate an IP address to the terminal, so that the terminal can perform data transmission through the WLAN AP.

Meanwhile, the S-GW records the MAC address and IP address of the terminal, and the BSSID of the currently associated WLAN AP. The BSSID is generally configured as a MAC address of the WLAN AP. The S-GW also stores a list of BSSIDs of all WLAN APs connected to the S-GW. In this way, the S-GW stores the correspondence between the MAC/IP address of the terminal and the BSSID of the associated WLAN AP. When the UE is associated with another WLAN AP, which is connected to the S-GW, due to movement of the UE, the S-GW updates the correspondence between the MAC/IP address of the terminal and the BSSID of the associated WLAN AP. According to the correspondence, the S-GW can send the downlink data of the terminal to the associated WLAN AP.

Basic functions of the LGW are to transmit user data, which is from a data convergence point, to an external IP network through UDP over IP, and meanwhile include, but not limited to, common packet data gateway functions: a DHCP (Dynamic Host Configuration Protocol, dynamic host configuration protocol) server automatically allocating an IP address to a terminal, a firewall or network address translation function, a deep packet inspection function (Deep Packet Inspection, DPI), a data stream policing (Policing) function, and a packet routing function (sending a user IP packet to a corresponding packet data network).

Therefore, in the embodiment of the present invention, a real single-network (Single-Network) is realized, and the WLAN is directly deployed on the network of an existing cellular system, and network planning, construction, and maintenance are simpler and cheaper when compared with construction of a new independent WLAN network.

Further, the embodiment of the present invention can support that a WLAN AP and a cellar evolved Node B eNB share a station address, and support independent WLAN hot spots sharing no station address, thereby making networking forms flexible. The WLAN may be regarded as a wireless air interface enhancement technology similar to carrier convergence or MIMO (Multiple Input Multiple Output, multiple input multiple output), which increases a transmission rate dramatically and effectively improves user experience.

Further, with the embodiment of the present invention, small modifications are made to existing LTE and WLAN air interfaces and network protocols, so implementation is simple.

Figure 16:
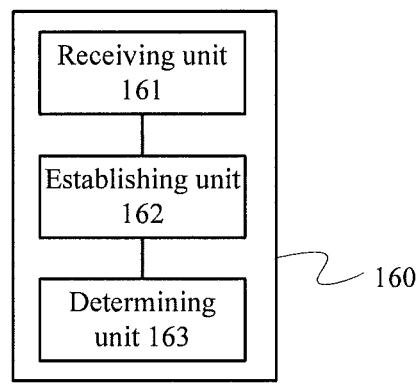
FIG. 16 is a schematic block diagram of an offloading point device according to an embodiment of the present invention.

FIG. 16 is a schematic block diagram of an offloading point device according to an embodiment of the present invention. An offloading point device 160 in FIG. 16 may be an S-GW or an eNB, and includes a receiving unit 161, an establishing unit 162, and a determining unit 163.

The receiving unit 161 receives offloading control signaling sent by a user equipment, where the offloading control signaling carries a cellular network identifier and a wireless local area network WLAN identifier of the user equipment. The establishing unit 162 establishes correspondence between the WLAN identifier of the user equipment and all bearer channels of the user equipment according to the cellular network identifier and the WLAN identifier of the user equipment. The determining unit 163 determines a bearer channel corresponding to all or a part of user data streams according to a data offloading manner determined by negotiating with the user equipment and the correspondence, where the data offloading manner is used to designate all or a part of the user data streams in a downlink and/or uplink direction of the user equipment that are transmitted through a WLAN air interface.

In the embodiment of the present invention, the bearer channel corresponding to all or a part of user data that is transmitted through the WLAN air interface is determined, so as to transmit all or a part of the user data through the WLAN air interface in the uplink or downlink direction, thereby increasing a transmission rate.

Figure 17:
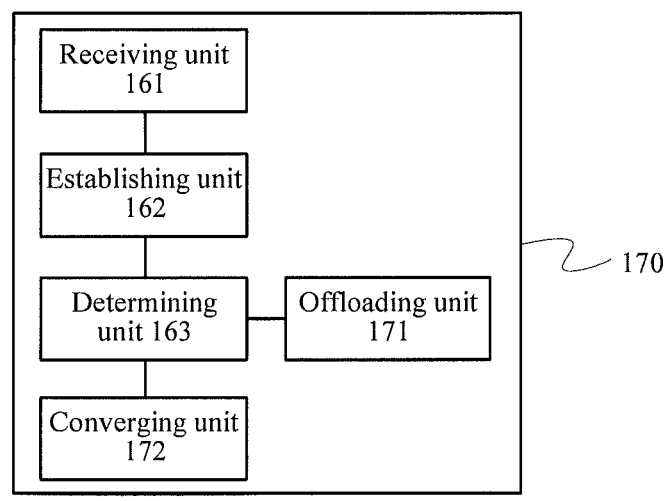
FIG. 17 is a schematic block diagram of an offloading point device according to another embodiment of the present invention.

FIG. 17 is a schematic block diagram of an offloading point device according to another embodiment of the present invention. In an offloading point device 170 in FIG. 17, the same reference numerals are used by the same or like parts as those in FIG. 16. In addition to a receiving unit 161, an establishing unit 162, and a determining unit 163, the offloading point device 170 in FIG. 17 further includes an offloading unit 171 and a converging unit 172.

The determining unit 163 is specifically configured to, according to a determined data offloading manner, establish an end-to-end tunnel with a user equipment that passes through a wireless local area network WLAN air interface, the end-to-end tunnel being used to transmit all or a part of user data streams, and establish correspondence between a tunnel number of the end-to-end tunnel and an E-RAB ID corresponding to a bearer channel. The tunnel number of the end-to-end tunnel may be a UDP port number or an E-RAB ID.

The offloading unit 171 receives all of user data streams of a downlink direction from a PDN-GW All of the user data streams in the downlink direction are obtained by the PDN-GW by dividing downlink user data of a user equipment through a downlink traffic flow template DL-TFT.

In this case, the offloading unit 171 determines an E-RAB ID corresponding to a bearer channel that is used for transmitting all or a part of the user data streams, and sends all or a part of the user data streams to the user equipment through an end-to-end tunnel corresponding to the determined E-RAB ID.

The offloading unit 171 sends the rest of the user data streams to the user equipment through at least one evolved packet system EPS bearer. The at least one EPS bearer is established for the user equipment through a control plane of a long term evolution LTE air interface.

For an uplink direction, all or a part of user data streams in the uplink direction are uplink user data streams that are sent by a user equipment through an end-to-end tunnel. The uplink user data streams are obtained by the user equipment by dividing uplink user data of the user equipment through an uplink traffic flow template UL-TFT.

In this case, the converging unit 172 receives an uplink user data stream, extracts a tunnel number of an end-to-end tunnel from the uplink user data stream, and sends the uplink user data stream through a bearer channel corresponding to the extracted tunnel number. In this embodiment of the present invention, the offloading unit 171 and the converging unit 172 may be combined into a functional unit.

In this way, the offloading point device 170 uses an existing TFT function of the LTE to transmit all or a part of the user data streams through an end-to-end tunnel between the offloading point device 170 and the UE, thereby increasing data transmission efficiency.

Figure 18:
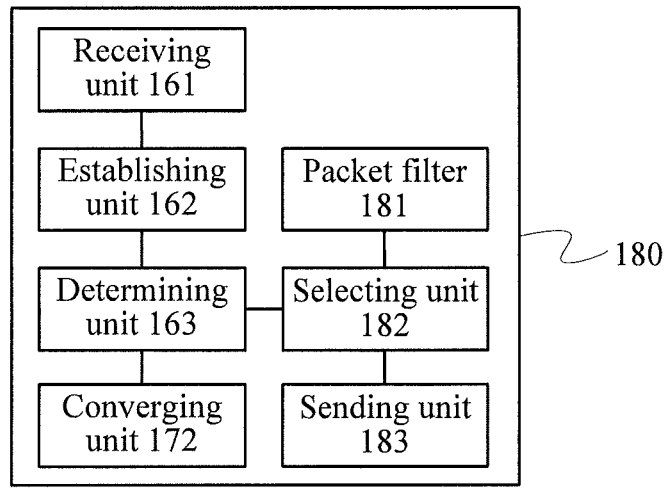
FIG. 18 is a schematic block diagram of an offloading point device according to another embodiment of the present invention.

FIG. 18 is a schematic block diagram of an offloading point device according to another embodiment of the present invention. In an offloading point device 180 of FIG. 18, the same reference numerals are used by the same or like parts as those in FIG. 16. In addition to a receiving unit 161, an establishing unit 162, and a determining unit 163, the offloading point device 180 in FIG. 18 further includes a packet filter 181, a selecting unit 182, a sending unit 183, and a converging unit 184. In the embodiment of FIG. 18, each packet data network PDN connection of a user equipment corresponds to a bearer channel.

The determining unit 163 is specifically configured to parse user data transmitted through an LTE air interface, obtain an IP address, corresponding to each PDN connection, of the user equipment, and establish correspondence between the IP address and the bearer channel.

The packet filter 181 divides downlink user data into user data streams. The selecting unit 182 select all or a part of the user data streams from the user data streams obtained after the dividing, according to a data offloading manner. The sending unit 183 sends all or a part of the user data streams to the user equipment through a WLAN air interface.

Further, the sending unit 183 sends the rest of the user data streams to the user equipment through an LTE air interface.

For an uplink direction, all or a part of user data streams in the uplink direction are uplink user data streams that are sent by a user equipment through a WLAN air interface. The uplink user data streams are obtained by the user equipment by dividing uplink user data of the user equipment through a packet filter outside an LTE communication module.

In this case, the converging unit 184 receives an uplink user data stream, extracts an IP address of the user equipment from the uplink user data stream, and sends the uplink user data stream through a bearer channel corresponding to the extracted IP address.

In this way, in this embodiment, the offloading point device 180 uses a built-in packet filter to divide data, and performs offloading/convergence on data streams according to the data offloading manner determined by negotiating, thereby improving transmission efficiency of a system.

Optionally, in an embodiment, offloading control signaling is application layer offloading control signaling that is transmitted between a user equipment and an offloading point device through an application layer of an LTE air interface.

Optionally, in an embodiment, when multiple EPS bearers exist between a user equipment and an offloading point device, the receiving unit 161 receives application layer offloading control signaling that is sent through a specific bearer among the multiple EPS bearers by the user equipment. Alternatively, the receiving unit 161 receives an IP packet sent by the user equipment. The IP packet carries the application layer offloading control signaling. A destination address of the IP packet is a specific IP address of the offloading point device. Alternatively, the receiving unit 161 receives an IP packet sent by the user equipment. The IP packet carries the application layer offloading control signaling. A destination address of the IP packet is a specific IP address of the offloading point device, and a TCP port number of the IP packet is a specific TCP port number.

In addition to that the application layer transmits the offloading control signaling, when the offloading point devices 160-180 are serving gateways S-GW, the offloading control signaling may also be transferred through a non-access-stratum NAS message, or when the offloading point devices 160-180 are evolved Node Bs eNB, the offloading control signaling may be transferred through a radio resource control RRC message.

Optionally, in an embodiment, through the offloading control signaling, an offloading point device notifies a user equipment that an accessible WLAN access point device is available in a current location, so that the user equipment determines whether to enable a WLAN function and/or a WLAN offloading function. Alternatively, through the offloading control signaling, an offloading point device notifies a user equipment that no accessible WLAN access point device is available in a current location, so that the user equipment determines whether to disable a WLAN function and/or a WLAN offloading function.

Optionally, in an embodiment, through the offloading control signaling, an offloading point device receives a basic service set identity BSSID of a WLAN access point device identified by a user equipment, determines, according to the BSSID, whether the WLAN access point device identified by the user equipment is in a management scope, and only allows the user equipment to be associated with a WLAN access point device in the management scope.

Optionally, in an embodiment, an offloading point device sends a WLAN identifier of the user equipment to a WLAN access point device, and the WLAN access point device regards the user equipment having the WLAN identifier as a legal terminal that is already authenticated, and allows the user equipment having the WLAN identifier to perform data transmission through the WLAN access point device.

Optionally, in an embodiment, before initiating serving gateway relocation, an offloading point device reconfigures user data determined to be transmitted through a WLAN to be transmitted through an LTE air interface, notifies, through the offloading control signaling, the user equipment that the user equipment can be dissociated from the WLAN access point device that is currently associated with the user equipment, or notifies, through a control plane interface between it and a WLAN access device, the user equipment that the WLAN access device that is currently associated with the user equipment can be dissociated from the user equipment.

Optionally, in an embodiment, an offloading point device makes statistics on the traffic and/or duration of all or a part of user data that is transmitted through a WLAN air interface, and provides an offline or online server with information of the traffic and/or duration.

A cellular network identifier of the user equipment may be an IMSI. A WLAN identifier of the user equipment may be a MAC address. The user data stream is an IP flow.

Figure 19:
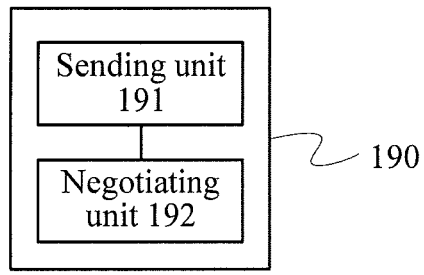
FIG. 19 is a schematic block diagram of a user equipment according to an embodiment of the present invention.

FIG. 19 is a schematic block diagram of a user equipment according to an embodiment of the present invention. An example of a user equipment 190 in FIG. 19 is a UE, which includes a sending unit 191 and a negotiating unit 192.

The sending unit 191 sends offloading control signaling to an offloading point device, where the offloading control signaling carries a cellular network identifier and a wireless local area network WLAN identifier of the user equipment, so that the offloading point device establishes correspondence between the WLAN identifier of the user equipment and all bearer channels of the user equipment according to the cellular network identifier and the WLAN identifier of the user equipment.

The negotiating unit 192 negotiates with the offloading point device to determine a data offloading manner, where the data offloading manner is used to designate all or a part of user data streams in a downlink and/or uplink direction of the user equipment that are transmitted through a WLAN air interface, so that the offloading point device determines, according to the data offloading manner and the correspondence, a bearer channel corresponding to all or a part of the user data streams.

In the embodiment of the present invention, the bearer channel corresponding to all or a part of user data transmitted through the WLAN air interface is determined, so as to transmit all or a part of the user data through the WLAN air interface in the uplink or downlink direction, thereby increasing a transmission rate.

Figure 20:
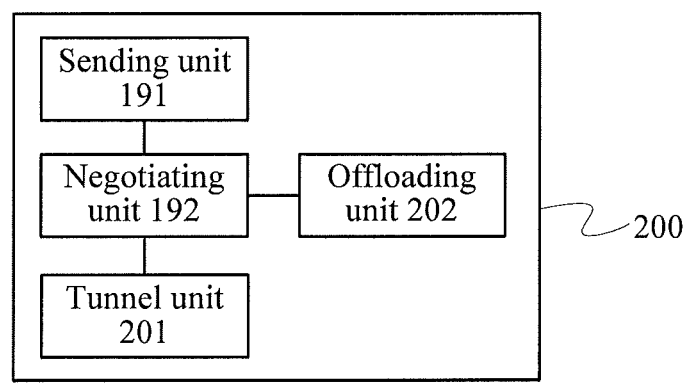
FIG. 20 is a schematic block diagram of a user equipment according to another embodiment of the present invention.

FIG. 20 is a schematic block diagram of a user equipment according to another embodiment of the present invention. In a user equipment 200 of FIG. 20, the same reference numerals are used by the same or like parts as those in FIG. 19. In addition to a sending unit 191 and a negotiating unit 192, the user equipment 200 further includes a tunnel unit 201 and an offloading unit 202.

The tunnel unit 201 establishes, according to a determined data offloading manner, an end-to-end tunnel that is between the user equipment and an offloading point device and passes through a wireless local area network WLAN air interface. The end-to-end tunnel is used to transmit all or a part of user data streams.

The offloading unit 202 divides uplink user data into user data streams through an uplink traffic flow template UL-TFT, and sends all or a part of the user data streams to the offloading point device through the end-to-end tunnel. All or a part of the user data streams carry a tunnel number of the end-to-end tunnel. The tunnel number of the end-to-end tunnel may be a UDP port number or an E-RAB ID.

Further, the offloading unit 202 sends the rest of the user data streams to the offloading point device through an LTE air interface.

In this way, the user equipment 200 uses an existing TFT function of the LTE to transmit all or a part of the user data streams through the end-to-end tunnel between the user equipment 200 and the UE, thereby increasing data transmission efficiency.

Figure 21:
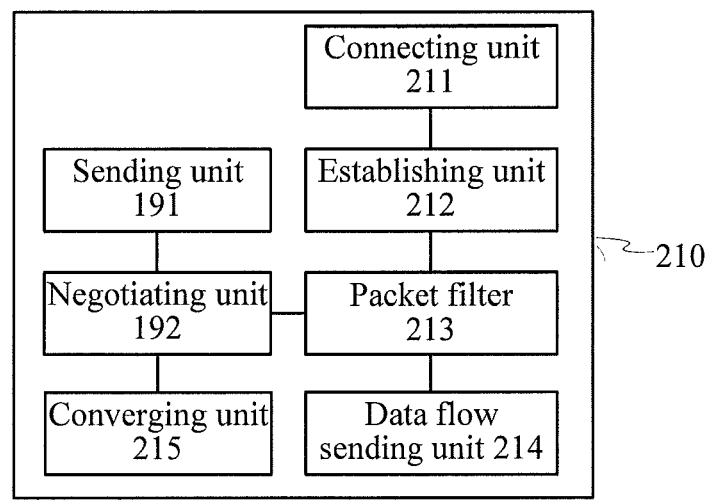
FIG. 21 is a schematic block diagram of a user equipment according to another embodiment of the present invention.

FIG. 21 is a schematic block diagram of a user equipment according to another embodiment of the present invention. In a user equipment 210 of FIG. 21, the same reference numerals are used by the same or like parts as those in FIG. 19. In addition to a sending unit 191 and a negotiating unit 192, the user equipment 200 further includes a connecting unit 211, an establishing unit 212, a packet filter 213, a data stream sending unit 214, and a converging unit 215.

The connecting unit 211 establishes a PDN connection between the user equipment and one or more packet data networks PDN through a control plane of a long term evolution LTE air interface. Each PDN connection corresponds to a bearer channel, and an IP address is allocated for each PDN connection. Optionally, when an IP address allocated by a second PDN is the same as an IP address allocated by a first PDN, the connecting unit 211 may request the second PDN to allocate an IP address to the user equipment again.

Further, the establishing unit 212 establishes correspondence between IP addresses of all PDN connections of the user equipment and application layers.

The packet filter 213 of the user equipment 210 is located outside an LTE communication module, and is configured to divide uplink user data from each PDN connection of an application layer into user data streams. The data stream sending unit 214 sends all or a part of the user data streams through a WLAN air interface according to the data offloading manner. All or a part of the user data streams carry an IP address corresponding to the application layer.

The data stream sending unit 214 sends the rest of the user data streams through an LTE air interface.

The converging unit 215 receives a downlink user data stream sent through the WLAN air interface, extracts a destination IP address carried in the downlink user data stream, and forwards the downlink user data stream to an application layer corresponding to the destination IP address.

In this way, the user equipment 210 of this embodiment uses a built-in packet filter (located outside a LTE communication module) to divide data, and performs offloading/convergence on data streams according to the data offloading manner determined by negotiating, thereby improving transmission efficiency of a system.

Optionally, in an embodiment, offloading control signaling is application layer offloading control signaling that is transmitted between a user equipment and an offloading point device through an application layer of an LTE air interface. In this case, when multiple EPS bearers exist between the user equipment and the offloading point device, the sending unit 191 sends application layer offloading control signaling to the offloading point device through a specific bearer among the multiple EPS bearers. Alternatively, the sending unit 191 sends an IP packet to the offloading point device. The IP packet carries the application layer offloading control signaling. A destination address of the IP packet is a specific IP address of the offloading point device. Alternatively, the sending unit 191 sends an IP packet to the offloading point device. The IP packet carries the application layer offloading control signaling. A destination address of the IP packet is a specific IP address of the offloading point device, and a TCP port number of the IP packet is a specific TCP port number.

Optionally, in an embodiment, when the offloading point device is a serving gateway S-GW, the offloading control signaling is transferred through a non-access-stratum NAS message. Alternatively, when the offloading point device is an evolved Node B eNB, the offloading control signaling is transferred through a radio resource control RRC message.

Optionally, in an embodiment, the user equipment receives a notification that is sent by the offloading point device through the offloading control signaling and indicates that an accessible WLAN access point device is available in a current location, and determines, according to the notification, whether to enable a WLAN function and/or a WLAN offloading function. Alternatively, the user equipment receives a notification that is sent by the offloading point device through the offloading control signaling and indicates that no accessible WLAN access point device is available in a current location, and determines, according to the notification, whether to disable a WLAN function and/or a WLAN offloading function.

Optionally, in an embodiment, the user equipment identifies a basic service set identity BSSID of a WLAN access point device, sends the identified BSSID to the offloading point device through the application layer offloading control signaling, so that the offloading point device determines, according to the BSSID, whether a WLAN access point device identified by the user equipment is in a management scope, and only allows the user equipment to be associated with a WLAN access point device in the management scope.

Referring to FIG. 1 to FIG. 2, FIG. 10 to FIG. 11, and FIG. 14 to FIG. 15, a communication system according to an embodiment of the present invention may include the offloading point devices 160-180 (for example, implemented as an eNB or an S-GW), or include the user equipments 190-210.

The communication system may further include a WLAN access point device (WLAN AP), which is connected to an eNB (for example, through an IP interface), shares a station address with the eNB, or is integrated with the eNB into a device (referring to FIG. 1 to FIG. 2). In a home network, a WLAN AP may be connected to an HeNB, shares a station address with an eNB, or is integrated with the eNB into a device (referring to FIG. 10 to FIG. 11).

In a WLAN-Only application scenario, the communication system may further include a local gateway LGW (referring to FIG. 14 to FIG. 15). The LGW is connected to an S-GW and a core network, and when a user equipment transmits data only through a WLAN air interface, uplink user data is received from the S-GW, the uplink user data is forwarded to the core network, and/or downlink user data is received from the core network and the downlink user data is forwarded to the S-GW. Basic functions of the LGW are to transmit user data, which is from a data convergence point, to an external IP network through UDP over IP, and meanwhile include, but not limited to, common packet data gateway functions: a DHCP server automatically allocating an IP address to a terminal, a firewall or network address translation function, a deep packet inspection function, a data stream policing function, and a packet routing function.

Optionally, in an embodiment, the communication system may include an access point control device (AC) connected to an offline or online server. The AC is configured to perform security authentication on a WLAN access device, network management, coordination, and/or interference processing.

The AC may be integrated with an S-GW into a device (referring to FIG. 2 and FIG. 14 to FIG. 15), or acts as an independent device connected to the S-GW (referring to FIG. 1). Alternatively, the AC may be integrated with an HeNB GW into a device (referring to FIG. 10), or acts as an independent device connected to the HeNB GW (referring to FIG. 11).

Persons of ordinary skill in the art may be aware that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the method embodiments, and details are not described herein again.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiments.

In addition, functional units in the embodiments of the present invention may be integrated into a processing unit, or each of the units may exist alone physically, or two or more units are integrated into a unit. The integrated unit may be implemented in a form of hardware, or may be implemented in a form of a software functional unit.

When the integrated units are implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, and the like) to perform all or a part of steps of the methods described in the embodiments of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A data transmission method, comprising:
receiving offloading control signaling sent by a user equipment, wherein the offloading control signaling carries a cellular network identifier and a wireless local area network (WLAN) identifier of the user equipment;
according to the cellular network identifier and the WLAN identifier of the user equipment, establishing correspondence between the WLAN identifier of the user equipment and bearer channels of the user equipment; and
according to a data offloading manner determined by negotiating with the user equipment and the correspondence, the data offloading manner being used to designate all or a part of user data streams in at least one of a downlink and uplink direction of the user equipment that are transmitted through a WLAN air interface corresponding to the WLAN identifier while maintaining control plane communication through a cellular network of the cellular network identifier, determining a bearer channel corresponding to all or a part of the user data streams.

2. The data transmission method according to claim 1, wherein the determining the bearer channel corresponding to all or a part of the user data streams comprises:
according to the determined data offloading manner, establishing an end-to-end tunnel with the user equipment that passes through a WLAN air interface, wherein the end-to-end tunnel is used to transmit all or a part of the user data streams; and
establishing correspondence between a tunnel number of the end-to-end tunnel and an evolved universal terrestrial radio access network (E-UTRAN) radio access bearer identifier (E-RAB ID) corresponding to the bearer channel.

3. The data transmission method according to claim 2, further comprising:
receiving all user data streams of a downlink direction from a packet data network (PDN) gateway (PDN-GW),
wherein all the user data streams of the downlink direction are obtained by the PDN-GW by dividing downlink user data of the user equipment through a downlink traffic flow template (DL-TFT).

4. The data transmission method according to claim 3, further comprising:
determining an E-RAB ID corresponding to a bearer channel that is for transmitting all or a part of the user data streams; and
sending all or a part of the user data streams to the user equipment through an end-to-end tunnel corresponding to the determined E-RAB ID.

5. The data transmission method according to claim 4, wherein when a part of the user data streams are sent to the user equipment through the end-to-end tunnel corresponding to the determined E-RAB ID, the method further comprises:
sending the rest of the user data streams to the user equipment through at least one evolved packet system (EPS) bearer, wherein the at least one EPS bearer is established for the user equipment through the control plane of a long term evolution (LTE) air interface.

6. The data transmission method according to claim 2, wherein all or a part of the user data streams of the uplink direction are uplink user data streams sent by the user equipment through an end-to-end tunnel, and
the uplink user data streams are obtained by the user equipment by dividing uplink user data of the user equipment through an uplink traffic flow template (UL-TFT).

7. The data transmission method according to claim 6, further comprising:
receiving an uplink user data stream, and extracting a tunnel number of the end-to-end tunnel from the uplink user data stream; and
sending the uplink user data stream through a bearer channel corresponding to the extracted tunnel number.

8. The data transmission method according to claim 1, wherein each packet data network (PDN) connection of the user equipment corresponds to a bearer channel.

9. The data transmission method according to claim 8, wherein the determining the bearer channel corresponding to all or a part of the user data streams comprises:
parsing user data transmitted through a long term evolution (LTE) air interface, and obtaining an Internet Protocol (IP) address, corresponding to each PDN connection, of the user equipment; and
establishing correspondence between the IP address and the bearer channel.

10. The data transmission method according to claim 9, further comprising:
using a built-in packet filter to divide downlink user data into user data streams; and
selecting the all or a part of the user data streams from the user data streams obtained after the dividing, according to the data offloading manner; and
sending the all or a part of the user data streams to the user equipment through the WLAN air interface.

11. The data transmission method according to claim 9, wherein all or a part of the user data streams of the uplink direction are uplink user data streams sent by the user equipment through the WLAN air interface, and
the uplink user data streams are obtained by the user equipment by dividing uplink user data of the user equipment through a packet filter located outside an LTE communication module.

12. The data transmission method according to claim 1, wherein the offloading control signaling is application layer offloading control signaling that is transmitted between the user equipment and an offloading point device through an application layer of a long term evolution (LTE) air interface.

13. The data transmission method according to claim 12, wherein the receiving the offloading control signaling sent by the user equipment comprises:
when multiple (evolved packet system (EPS) bearers exist between the user equipment and the offloading point device, receiving the application layer offloading control signaling that is sent through a specific bearer among the multiple EPS bearers by the user equipment; or
receiving an Internet Protocol (IP) packet sent by the user equipment, wherein the IP packet carries the application layer offloading control signaling, and a destination address of the IP packet is a specific IP address of the offloading point device; or
receiving an IP packet sent by the user equipment, wherein the IP packet carries the application layer offloading control signaling, a destination address of the IP packet is a specific IP address of the offloading point device, and a transmission control protocol (TCP) port number of the IP packet is a specific TCP port number.

14. The data transmission method according to claim 1, wherein when the method is executed by a serving gateway (S-GW), the offloading control signaling is transferred through a non-access-stratum (NAS) message; or when the method is executed by an evolved Node B (eNB), the offloading control signaling is transferred through a radio resource control (RRC) message.

15. The method according to claim 12, further comprising:
through the offloading control signaling, receiving a basic service set identity (BSSID) of a WLAN access point device identified by the user equipment, determining, according to the BSSID, whether the WLAN access point device identified by the user equipment is managed by the cellular network, and allowing the user equipment to be associated with the WLAN access point upon determining that the WLAN access point device identified by the user equipment is managed by the cellular network.

16. The method according to claim 15, further comprising:
sending the WLAN identifier of the user equipment to the WLAN access point device, or receiving the Internet Protocol (IP) address from the user equipment through the offloading control signaling and sending the WLAN identifier and the IP address to the WLAN access point device; and through the offloading control signaling, negotiating an encryption algorithm of the WLAN air interface and a key to the encryption algorithm with the user equipment, and sending the encryption algorithm and the key to the encryption algorithm to the WLAN access point device, so that the WLAN access point device establishes a binding relationship between the WLAN identifier and the key to the encryption algorithm, or establishes a binding relationship between the WLAN identifier, the IP address and the key to the encryption algorithm, and regards a user equipment satisfying the binding relationship as a legal terminal that is already authenticated.

17. The method according to claim 12, further comprising:
before initiating serving gateway (S-GW) relocation, reconfiguring user data, which is determined to be transmitted through the WLAN, to be transmitted through the LTE air interface, notifying, through the offloading control signaling, the user equipment that the user equipment can be dissociated from a WLAN access point device that is currently associated with the user equipment, or notifying, through the control plane interface between it and a WLAN access device, the user equipment that a WLAN access device that is currently associated with the user equipment can be dissociated from the user equipment.

18. The method according to any one of claim 1, further comprising: making statistics on at least one of traffic and a duration of all or a part of user data transmitted through the WLAN air interface, and providing an offline or online server with information of the at least one of the traffic and the duration.

19. A data transmission method, comprising:
sending offloading control signaling to an offloading point device, wherein the offloading control signaling carries a cellular network identifier and a wireless local area network (WLAN) identifier of a user equipment, so that the offloading point device establishes correspondence between the WLAN identifier of the user equipment and all bearer channels of the user equipment according to the cellular network identifier and the WLAN identifier of the user equipment; and negotiating with the offloading point device to determine a data offloading manner, wherein the data offloading manner is used to designate all or a part of user data streams in at least one of a downlink and uplink direction of the user equipment that are transmitted through a WLAN air interface corresponding to the WLAN identifier while maintaining control plane communication through a cellular network of the cellular network identifier, so that the offloading point device determines, according to the data offloading manner and the correspondence, a bearer channel corresponding to all or a part of the user data streams.

20. The data transmission method according to claim 19, further comprising:
according to the determined data offloading manner, establishing an end-to-end tunnel between the user equipment and the offloading point device that passes through a WLAN air interface, wherein the end-to-end tunnel is used to transmit all or a part of the user data streams.

21. The data transmission method according to claim 20, further comprising:
dividing uplink user data into user data streams through an uplink traffic flow template (UL-TFT); and
sending all or a part of the user data streams to the offloading point device through the end-to-end tunnel, wherein all or a part of the user data streams carry a tunnel number of the end-to-end tunnel.

22. The data transmission method according to claim 21, wherein the tunnel number of the end-to-end tunnel is a user datagram protocol (UDP) port number or an evolved universal terrestrial radio access network (E-UTRAN) radio access bearer identifier (E-RAB ID).

23. The data transmission method according to claim 19, wherein before the sending the offloading control signaling to the offloading point device, the method further comprises:
establishing a packet data network (PDN) connection between the user equipment and one or more PDNs through the control plane of a long term evolution (LTE) air interface, wherein each PDN connection corresponds to a bearer channel, and an Internet Protocol (IP) address is allocated for each PDN connection.

24. The data transmission method according to claim 23, further comprising:
when an IP address allocated by a second PDN is the same as an IP address allocated by a first PDN, requesting the second PDN to allocate an IP address to the user equipment again.

25. The data transmission method according to claim 23, further comprising:
establishing correspondence between IP addresses of all PDN connections of the user equipment and application layers.

26. The data transmission method according to claim 25, further comprising:
dividing uplink user data from each PDN connection of an application layer into user data streams through a packet filter located outside an LTE communication module; and
sending all or a part of the user data streams through the WLAN air interface according to the data offloading manner, wherein all or a part of the user data streams carry an IP address corresponding to the application layer.

27. The data transmission method according to claim 19, wherein the offloading control signaling is application layer offloading control signaling that is transmitted between the user equipment and the offloading point device through an application layer of a long term evolution (LTE) air interface.

28. The data transmission method according to claim 27, wherein the sending the offloading control signaling to the offloading point device comprises:
  when multiple evolved packet system (EPS) bearers exist between the user equipment and the offloading point device, sending the application layer offloading control signaling to the offloading point device through a specific bearer among the multiple EPS bearers; or
  sending an Internet Protocol (IP) packet to the offloading point device, wherein the IP packet carries the application layer offloading control signaling, and a destination address of the IP packet is a specific IP address of the offloading point device; or
  sends an IP packet to the offloading point device, wherein the IP packet carries the application layer offloading control signaling, a destination address of the IP packet is a specific IP address of the offloading point device, and a transmission control protocol (TCP) port number of the IP packet is a specific TCP port number.

29. The data transmission method according to claim 19, wherein
  when the offloading point device is a serving gateway (S-GW), the offloading control signaling is transferred through a non-access-stratum (NAS) message; or
  when the offloading point device is an evolved Node B (eNB), the offloading control signaling is transferred through a radio resource control (RRC) message.

30. The method according to any one of claim 19, further comprising:
  identifying a basic service set identity (BSSID) of the WLAN access point device; and
  through the application layer offloading control signaling, sending the identified BSSID to the offloading point device, so that the offloading point device determines, according to the BSSID, whether the WLAN access point device identified by the user equipment is managed by the cellular network, and allows the user equipment to be associated with a WLAN access point device upon determining that the WLAN access point is managed by the cellular network.

31. An offloading point device, comprising:
  a receiving unit, configured to receive offloading control signaling sent by a user equipment, wherein the offloading control signaling carries a cellular network identifier and a wireless local area network (WLAN) identifier of the user equipment;
  an establishing unit, configured to establish correspondence between the WLAN identifier of the user equipment and all bearer channels of the user equipment according to the cellular network identifier and the WLAN identifier of the user equipment; and
  a determining unit, configured to determine a bearer channel corresponding to all or a part of user data streams according to a data offloading manner determined by negotiating with the user equipment and the correspondence, wherein the data offloading manner is used to designate all or a part of the user data streams in at least one of a downlink and uplink direction of the user equipment that are transmitted through a WLAN air interface corresponding to the WLAN identifier while maintaining control plane communication through a cellular network of the cellular network identifier.

32. The offloading point device according to claim 31, wherein the offloading point device is an evolved Node B device or a serving gateway (S-GW) device.

33. The offloading point device according to claim 31, wherein the determining unit is specifically configured to, according to the determined data offloading manner, establish an end-to-end tunnel with a user equipment that passes through a WLAN air interface, the end-to-end tunnel being used to transmit all or a part of the user data streams, and establish correspondence between a tunnel number of the end-to-end tunnel and an evolved universal terrestrial radio access network (E-UTRAN) radio access bearer identifier (E-RAB ID) corresponding to the bearer channel.

34. The offloading point device according to claim 31, wherein each packet data network (PDN) connection of the user equipment corresponds to a bearer channel, and
  the determining unit is specifically configured to parse user data transmitted through a long term evolution (LTE) air interface, obtain an Internet Protocol (IP) address, corresponding to each PDN connection, of the user equipment, and establish correspondence between the IP address and the bearer channel.

35. The offloading point device according to claim 34, further comprising:
  a packet filter, configured to divide downlink user data into user data streams;
  a selecting unit, configured to select all or a part of the user data streams from the user data streams obtained after the dividing, according to the data offloading manner; and
  a sending unit, configured to send all or a part of the user data streams to the user equipment through the WLAN air interface.

36. A user equipment, comprising:
  a sending unit, configured to send offloading control signaling to an offloading point device, wherein the offloading control signaling carries a cellular network identifier and a wireless local area network (WLAN) identifier of the user equipment, so that the offloading point device establishes correspondence between the WLAN identifier of the user equipment and all bearer channels of the user equipment according to the cellular network identifier and the WLAN identifier of the user equipment; and
  a negotiating unit, configured to negotiate with the offloading point device to determine a data offloading manner, wherein the data offloading manner is used to designate all or a part of user data streams in at least one of a downlink and uplink direction of the user equipment that are transmitted through a WLAN air interface corresponding to the WLAN identifier while maintaining control plane communication through a cellular network of the cellular network identifier, so that the offloading point device determines, according to the data offloading manner and the correspondence, a bearer channel corresponding to all or a part of the user data streams.

37. The user equipment according to claim 36, further comprising a tunnel unit, configured to establish, according to the determined data offloading manner, an end-to-end tunnel that is between the user equipment and the offloading point device and passes through a WLAN air interface, wherein the end-to-end tunnel is used to transmit all or a part of the user data streams.

38. The user equipment according to claim 36, further comprising:
  a connecting unit, configured to establish a packet data network (PDN) connection between the user equipment and one or more PDNs through the control plane of a long term evolution (LTE) air interface, wherein each PDN connection corresponds to a bearer channel, and an Internet Protocol (IP) address is allocated for each PDN connection.

39. The user equipment according to claim 36, further comprising:
- an establishing unit, configured to establish correspondence between Internet Protocol (IP) addresses of all packet data network (PDN) connections of the user equipment and application layers.

40. The user equipment according to claim 39, further comprising:
- a packet filter, located outside a long term evolution (LTE) communication module and configured to divide uplink user data from each PDN connection of an application layer into user data streams; and
- a WLAN sending unit, configured to send all or a part of the user data streams through the WLAN air interface according to the data offloading manner, wherein all or a part of the user data streams carry an IP address corresponding to the application layer.

* * * * *